United States Patent
Bryan et al.

(10) Patent No.: US 9,146,750 B2
(45) Date of Patent: Sep. 29, 2015

(54) MECHANISM FOR REPLACING AN ARRAY CREATION ROUTINE WITHIN CODE

(75) Inventors: Thomas Albert Bryan, Westborough, MA (US); Julia Palmateer Wall, Newton, MA (US); David A. Foti, Holliston, MA (US)

(73) Assignee: The MathWorks, Inc., Natick, MA (US)

( * ) Notice: Subject to any disclaimer, the term of this patent is extended or adjusted under 35 U.S.C. 154(b) by 187 days.

(21) Appl. No.: 13/572,386

(22) Filed: Aug. 10, 2012

(65) Prior Publication Data

US 2014/0047418 A1 Feb. 13, 2014

(51) Int. Cl.
*G06F 9/44* (2006.01)
*G06F 17/00* (2006.01)
*H04W 4/00* (2009.01)
*G06F 9/45* (2006.01)

(52) U.S. Cl.
CPC . *G06F 9/443* (2013.01); *G06F 8/30* (2013.01); *G06F 8/315* (2013.01); *G06F 8/437* (2013.01)

(58) Field of Classification Search
CPC .............. G06F 8/20; G06F 8/30; G06F 8/31; G06F 8/41; G06F 8/51; G06F 8/52; G06F 8/443; G06F 8/447; G06F 9/455
See application file for complete search history.

(56) References Cited

U.S. PATENT DOCUMENTS

| 5,295,256 | A | * | 3/1994 | Bapat | 717/137 |
|---|---|---|---|---|---|
| 5,675,714 | A | * | 10/1997 | Kato | 706/45 |
| 5,732,273 | A | * | 3/1998 | Srivastava et al. | 717/128 |
| 6,085,035 | A | | 7/2000 | Ungar | |
| 6,857,119 | B1 | | 2/2005 | Desai | |
| 7,000,227 | B1 | * | 2/2006 | Henry | 717/152 |
| 7,971,194 | B1 | | 6/2011 | Gilboa | |
| 8,006,243 | B2 | | 8/2011 | Lum | |
| 8,042,102 | B2 | | 10/2011 | Dewitt et al. | |
| 8,161,463 | B2 | | 4/2012 | Johnson et al. | |
| 8,166,465 | B2 | | 4/2012 | Feblowitz et al. | |
| 8,176,475 | B2 | * | 5/2012 | Kosche et al. | 717/127 |
| 8,402,435 | B1 | | 3/2013 | Spiro | |

(Continued)

OTHER PUBLICATIONS

Co-pending U.S. Appl. No. 13/826,957 entitled "Creating and Using Array Creation Routines or a Family of Routine Separate from Algorithmic Code", filed Mar. 14, 2013, by Bryan et al. 39 pages.
Co-pending U.S. Appl. No. 13/572,389 entitled "A Mechanism for Transforming Between Type-Independent and Type-Specific Code", filed Aug. 10, 2012, by Palmateer et al., 83 pages.

(Continued)

*Primary Examiner* — Don Wong
*Assistant Examiner* — Mohammad Kabir
(74) *Attorney, Agent, or Firm* — Harrity & Harrity, LLP

(57) ABSTRACT

A system obtains code that includes sequences of code; identifies, within a first sequence of code and based on obtaining the code, a first routine that, when executed, enables an array of values to be generated. The array of values is associated with a variable included within the first routine. The system determines whether the routine includes a particular term, and identifies, within the routine, a first identifier when the routine includes the particular term. The first identifier corresponds to a second sequence of code that identifies a first data structure that stores information that identifies one or more second routines. The system identifies, within the data structure, a second routine based on the particular term and a second identifier corresponding to the first routine; executes, using the variable, the second routine to generate a result; and outputs the result based on executing the second routine.

27 Claims, 17 Drawing Sheets

(56) References Cited

U.S. PATENT DOCUMENTS

| | | | |
|---|---|---|---|
| 2003/0145312 | A1 | 7/2003 | Bates et al. |
| 2005/0039177 | A1* | 2/2005 | Burke ........................... 717/165 |
| 2006/0036656 | A1 | 2/2006 | Mercer |
| 2007/0033576 | A1* | 2/2007 | Tillmann et al. ............. 717/124 |
| 2007/0294704 | A1 | 12/2007 | Stephen et al. |
| 2008/0036783 | A1 | 2/2008 | Kulkarni |
| 2008/0222616 | A1 | 9/2008 | Cheng et al. |
| 2008/0240039 | A1* | 10/2008 | Parekh et al. ................. 370/331 |
| 2008/0270993 | A1 | 10/2008 | Tateishi et al. |
| 2009/0024802 | A1 | 1/2009 | Yeh |
| 2009/0125796 | A1* | 5/2009 | Day et al. ...................... 715/219 |
| 2009/0222798 | A1 | 9/2009 | Iguchi et al. |
| 2011/0010690 | A1 | 1/2011 | Howard et al. |
| 2011/0055806 | A1* | 3/2011 | Chicherin et al. ............ 717/106 |
| 2013/0027230 | A1* | 1/2013 | Marpe et al. .................. 341/107 |
| 2013/0239099 | A1 | 9/2013 | Kruglick |

OTHER PUBLICATIONS

Notification of Transmittal of the International Search Report and the Written Opinion of the International Searching Authority, or the Declaration corresponding to PCT/US2013/053588, mailed Nov. 14, 2013, 10 pages.

"Generics in Java-Wikipedia, the free encyclopedia", Aug. 9, 2012, XP055086281, http://en.wikipedia.org/w/index.php?title_Generics_in_Java&oldid=506514772, 8 pages.

"Generic programming-Wikipedia, the free encyclopedia", Aug. 8, 2012, XP055086285, http://en.wikipedia.org/w/index.php?title_Generic_programming&oldid=506450229, 22 pages.

Berman et al., The Grads Project: Software Support for High-Level Grid Application Development, The International Journal of High Performance Computing Applications, vol. 15, No. 4, Winter 2001, pp. 327-344.

* cited by examiner

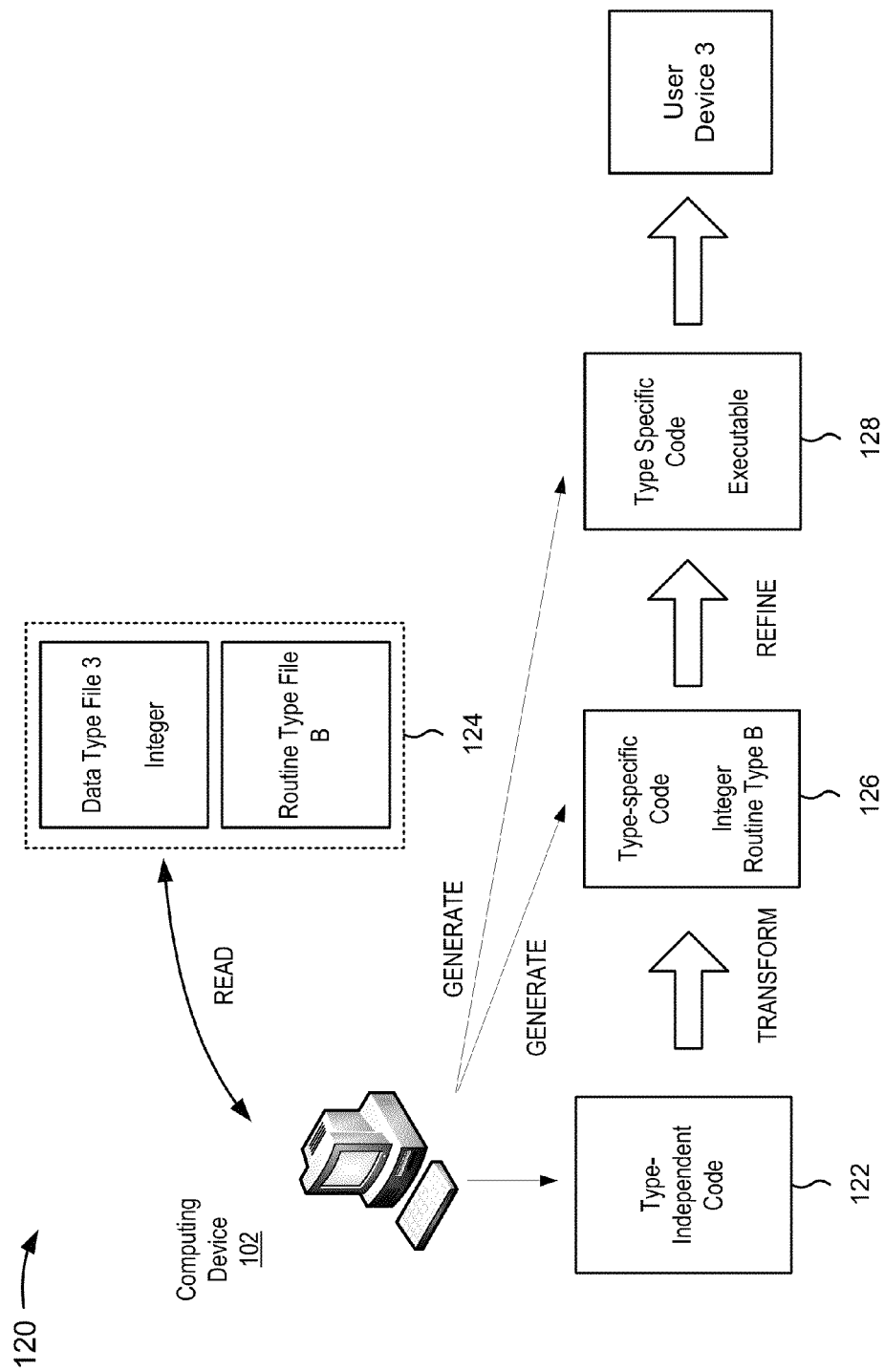

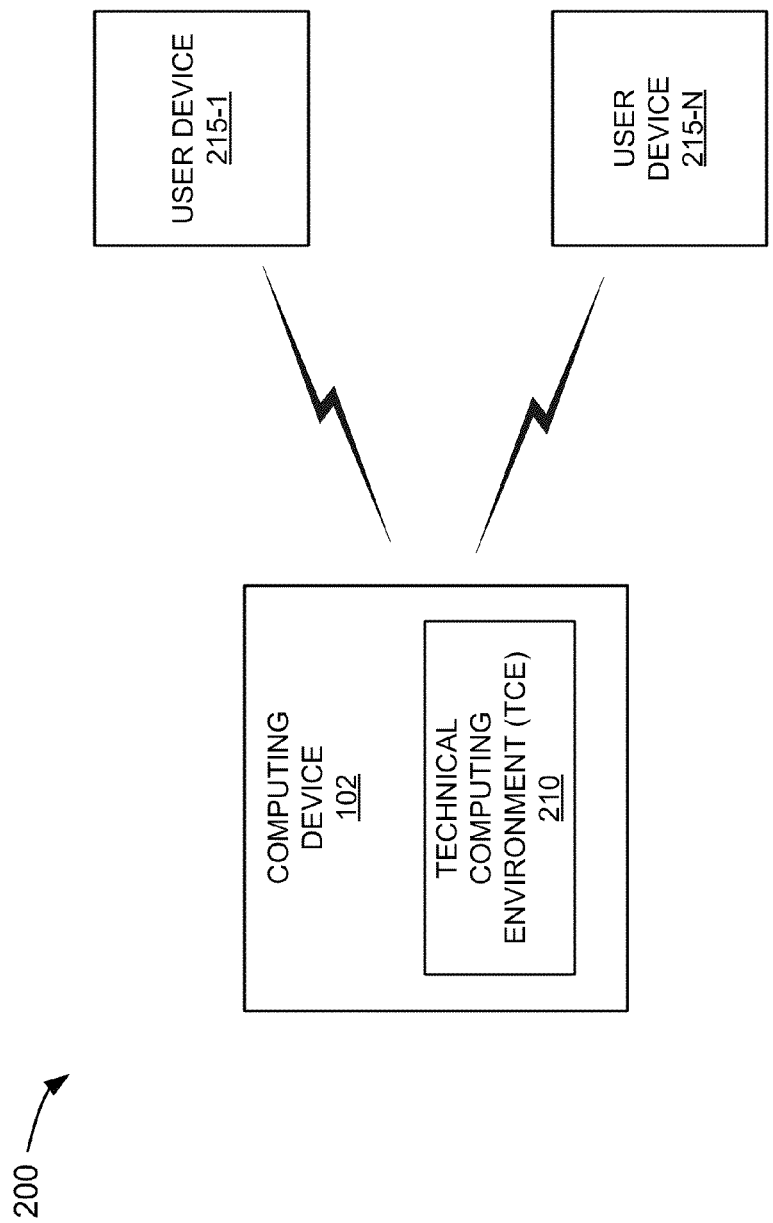

```
 ... 53 % Input Arguments
 54 Framesize = length(signal_in)
 ...
 75 % Set up
 ...
 78 Filterlength = 32
 ...
 81 mu = 2^(-12)
 ...
 86 weights = zeros(Filterlength, 1)
 ...
 89 fifo = zeros(Filterlength, 1)
 ...
 94 % Output Arguments
 ...
 97 signal_out = zeros (Framesize, 1)
 98 err = zeros(Framesize, 1)
 ...
101 % Algorithm
 ...
116 weights(:) = weights + mu*err(n)*fifo(:)
 ...
123 weights_out = weights
 ...
 end
```

405 ⟶ ...
53 % Input Arguments
54 Framesize = fi(length(signal_in), 0, 12, 0)
...                    415  410
75 % Set up    425  430
78 Filterlength = fi(32, 0, 6, 0)
410 ⟶ ...
81 mu = fi(2^(−12),0, 16, 27)
...
86 weights = fi(zeros(Filterlength, 1), 1, 16, 16)
...
89 fifo = fi(zeros(Filterlength, 1), 1, 16, 12)
...
94 % Output Arguments
...
97 signal_out = fi(zeros(Framesize, 1), 1, 16, 13)
98 err = fi(zeros(Framesize, 1), 1, 16, 14)
...
101 % Algorithm
...
116 weights( : ) = fi(weights + mu*err(n)*fifo( : ), 1, 16, 13)
...
123 weights_out = fi(weights, 1, 16, 16)
...
end

...
52 % Get Data Types
53  T = masterDTF() ⟵ 452
...                    457
55 % Input Arguments ⟵
56 Framesize = length(signal_in)
     455
...
77 % Set up
...
80  Filterlength = 32
                                    470
83 mu = cast(2^(−12),'like',T.mu) ⟵ 465
88 weights = zeros(Filterlength, 1,'like',T.weights)  475
       460
91 fifo = zeros(Filterlength, 1,'like',T.fifo)  480
                                         465
...
96 % Output Arguments
...
99 signal_out = zeros(Framesize, 1,'like',T.signal_out)  485
100 err = zeros(Framesize, 1,'like',T.err)
...
103 % Algorithm                                    490
...
118 weights( : ) = weights + cast(mu*err(n),'like',T.weights)*fifo( : )
125 weights_out = cast(weights,'like',T.weights_out)  495
...
end

Fig. 4C

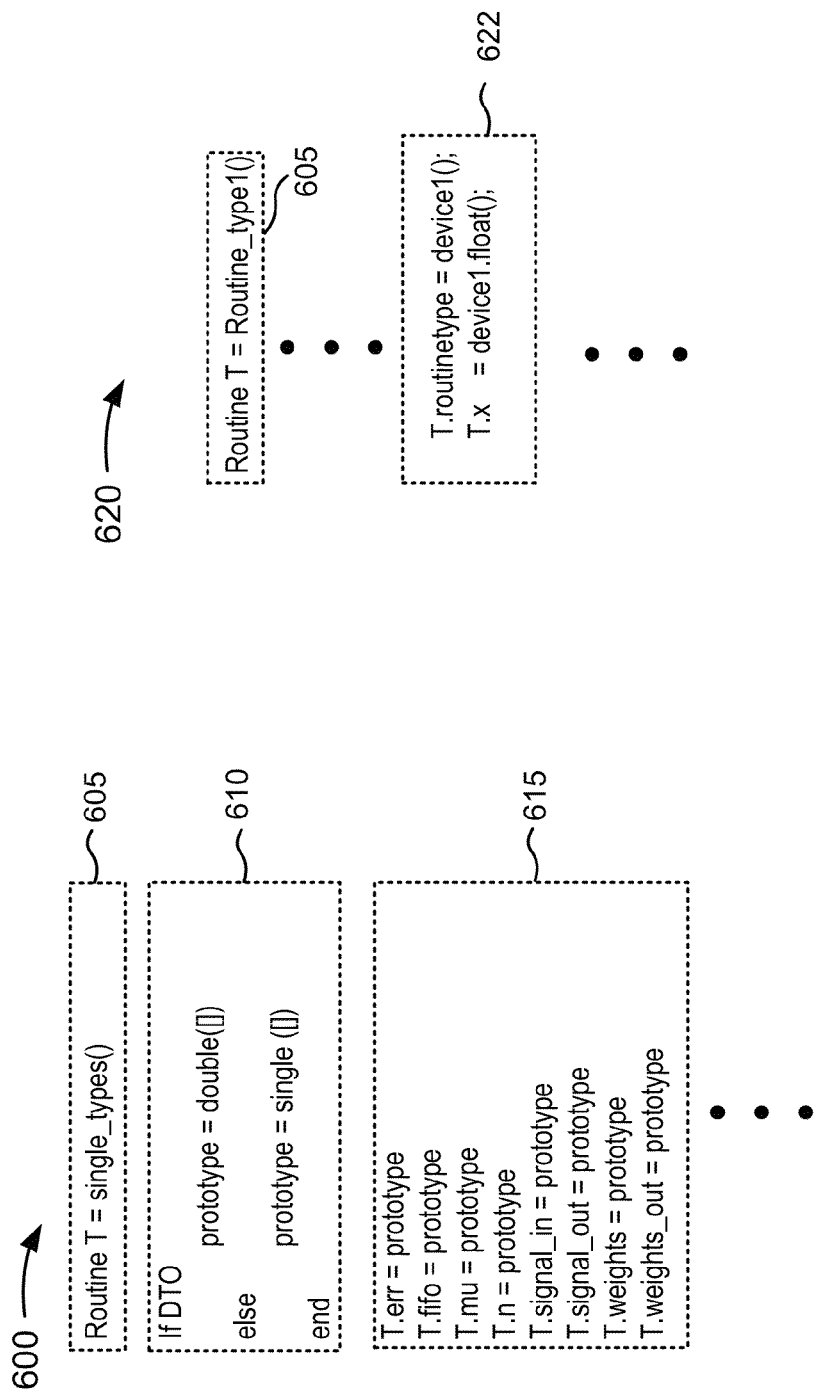

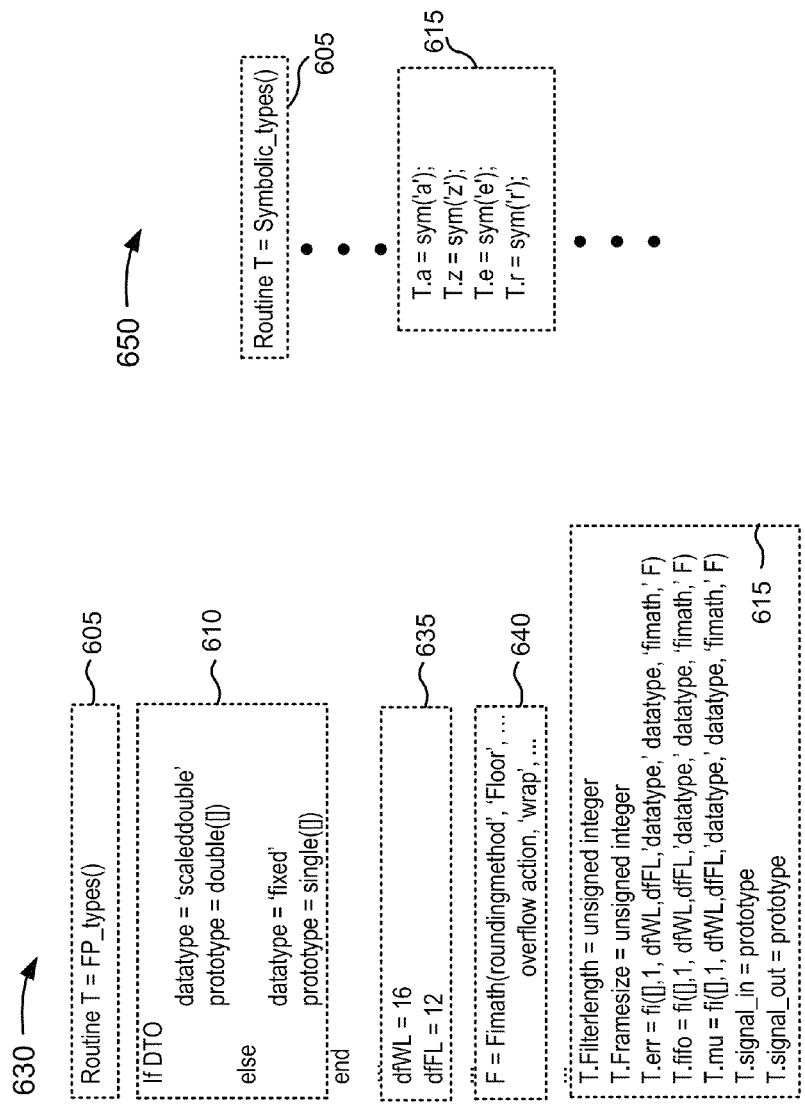

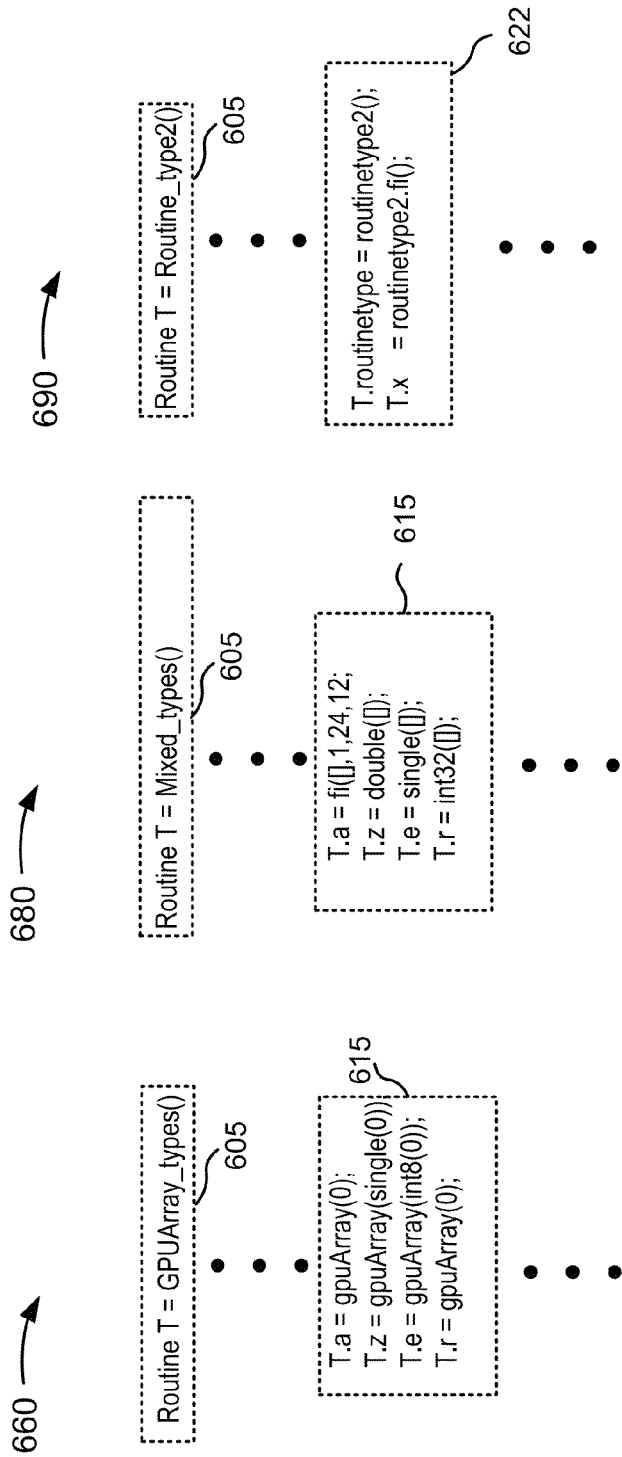

MECHANISM FOR REPLACING AN ARRAY CREATION ROUTINE WITHIN CODE

BRIEF DESCRIPTION OF THE DRAWINGS

FIGS. 1C and 1D are diagrams of an example overview of an implementation described herein;

FIG. 2 is a diagram of an example environment in which systems and/or methods, described herein, may be implemented;

FIGS. 4A and 4B are diagrams of example type-specific code;

FIG. 4C is a diagram of example type-independent code;

FIGS. 6A-6G are diagrams of example data structures that store data type information and/or routine type information;

DETAILED DESCRIPTION

Figure 1A:
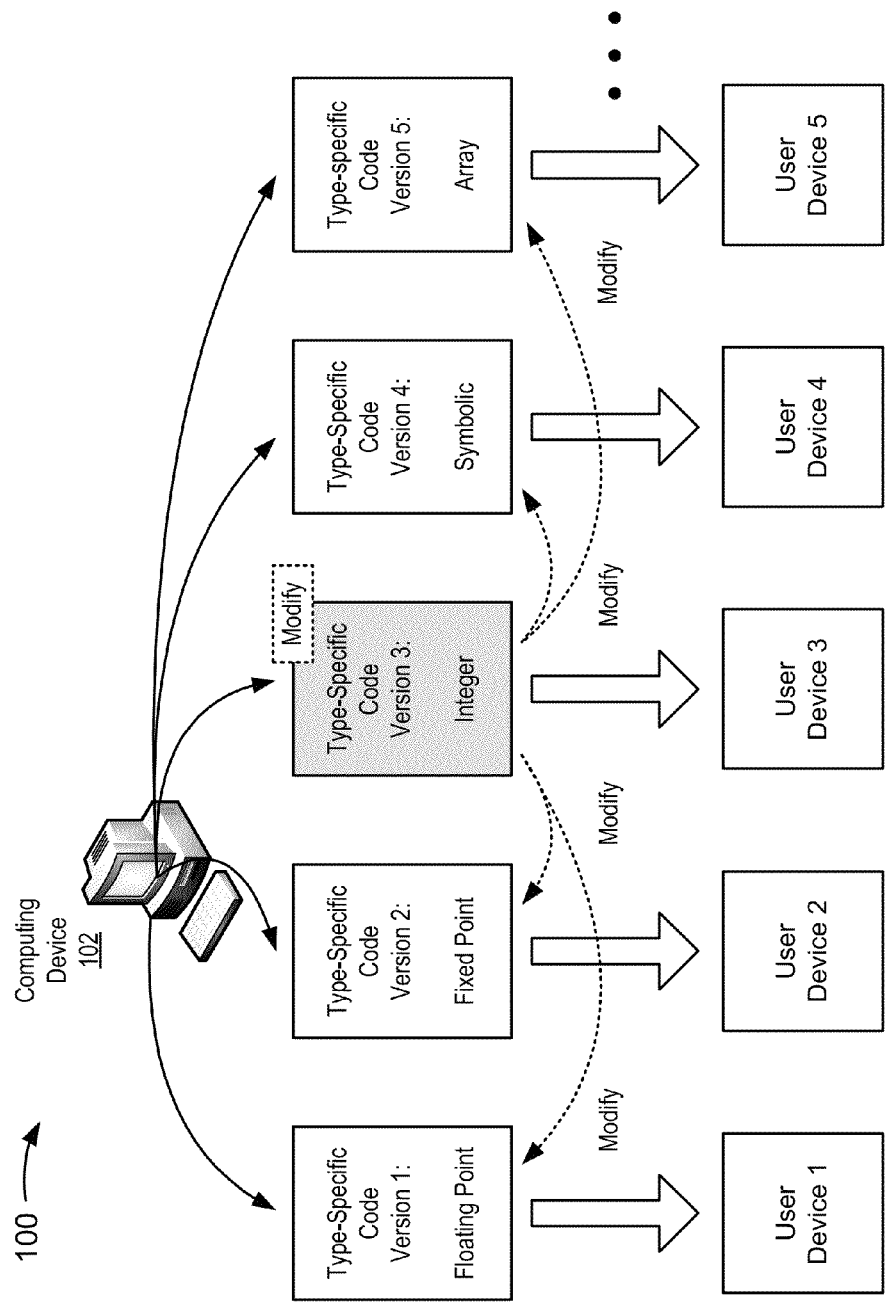
FIGS. 1A and 1B are diagrams illustrating example systems that generate and/or execute type-specific code associated with a set of data types and/or a set of routine types.

The following detailed description refers to the accompanying drawings. The same labels and/or reference numbers in different drawings may identify the same or similar elements.

Systems and/or methods, described herein, may enable a computing device to generate code that is not associated with a data type or a routine type. This type of code can be referred to as type-independent code or polymorphic code and may be generated based on other code that is associated with a data type and/or a routine type. The other code associated with the data type and/or the routine type can be referred to as type-specific code. The type-independent code may correspond to all or a portion of the code that does not include information associated with a data type and/or information associated with a routine type. Information associated with a data type may be referred to as data type information and the information associated with the routine type may be referred to as routine type information. The type-specific code may correspond to all or a portion of the code that includes data type information and/or the routine type information. The systems and/or methods may also, or alternatively, enable the computing device to generate type-specific code based on type-independent code.

The data type information may identify a data type associated with variables and/or routines within code. A routine may be a collection of instructions or a compiled version of those instructions. A routine may be referred to as a procedure, sub-procedure, subroutine, function, or operation. The routine, when executed by a computing device, may cause the computing device to perform an act or operation. The data type information may, for example, correspond to a floating point data type (e.g., single precision, double precision, high precision, etc.); a signed and/or unsigned fixed point data type (e.g., 8 bit, 16 bit, 32 bit, etc.); a signed and/or unsigned integer data type (e.g., 4 bit, 8, bit, 16 bit, 32 bit, etc.); a symbolic data type; an array data type (e.g., a graphics processing unit (GPU) array data type, a distributed and/or co-distributed array data type, etc.); and/or a combination thereof associated with one or more variables and/or routines within code. Thus, in one example, data type information, that corresponds to the floating point data type, may also include information associated with the array data type and/or some other data type (e.g., fixed point data type, etc.). The data type information will be described in greater detail below. The routine type information may include and/or identify routines and/or instructions that are optimized for and/or can be executed by a type of user device that is based on a particular type of device architecture. Additionally, or alternatively, the routine type information may include and/or identify routines and/or instructions that are based on a particular algorithmic implementation of a routine (e.g., a sine routine may be executed by polynomial approximation, a table lookup, etc.). The routine type information will be described in greater detail below.

Generating the type-independent code may enable the data type information and/or the routine type information to be separate from the type-independent code. Separating the data type information and/or the routine type information, from the type-independent code, may enable a single version of type-independent code to be generated and/or executed, using different data type information and/or routine type information, instead of generating and/or executing different versions of type-specific code that includes different data type information and/or routine type information within the code.

The systems and/or methods may enable a computing device to execute a routine to create an array (hereinafter referred to as an array creation routine), included within code, that causes the computing device to obtain a different array creation routine stored within a data structure, table, file, etc. Thus, the array creation routine may be replaced, by the different array creation routine, without changing the code.

The systems and/or methods may use a computing environment, such as a technical computing environment (TCE), for performing computing operations. A TCE may include any hardware and/or software based logic that provides a computing environment that allows tasks to be performed (e.g., by users) related to disciplines, such as, but not limited to, mathematics, science, engineering, medicine, and business. The TCE may include text-based environments (e.g., MATLAB® software), a graphically-based environment (e.g., Simulink® software, Stateflow® software, SimEvents® software, etc., by The MathWorks, Inc.; VisSim by Visual Solutions; LabView® by National Instruments; etc.), or another type of environment, such as a hybrid environment that may include, for example, one or more of the above-referenced text-based environments and one or more of the above-referenced graphically-based environments.

The TCE may be integrated with or operate in conjunction with a graphical modeling environment, which may provide graphical tools for constructing models or systems or processes. The TCE may include additional tools, such as tools designed to convert a model into an alternate representation, such as source computer code, compiled computer code, or a hardware description (e.g., a description of a circuit layout). In an implementation, the TCE may provide these functions as block sets. In still another implementation, the TCE may provide these functions in another way.

Models generated with the TCE may be, for example, models of a physical system, a computing system, an engineered system, an embedded system, a biological system, a chemical system, etc.

A model generated with the TCE may include, for example, any equations, assignments, constraints, computations, algorithms, and/or process flows. The model may be implemented as, for example, time-based block diagrams (e.g., via the Simulink software, discrete-event based diagrams (e.g., via the SimEvents software), dataflow diagrams, state transition diagram (e.g., via the Stateflow software), software diagrams, a textual array-based and/or dynamically typed language (e.g., via the MATLAB software), and/or any other type of model.

As previously mentioned, an example implementation of the TCE may use one or more text-based products, such as textual modeling environments. For example, a text-based modeling environment, may be implemented using additional products such as, but not limited to Octave, Python, Comsol Script, and MATRIXx from National Instruments; Mathematica from Wolfram Research, Inc.; Mathcad from Mathsoft Engineering & Education Inc.; Maple from Maplesoft; Extend from Imagine That Inc.; Scilab from The French Institution for Research in Computer Science and Control (INRIA); Virtuoso from Cadence; or Modelica or Dymola from Dynasim. In some implementations, the text-based modeling environment may include hardware and/or software based logic that provides a computing environment that allows users to perform tasks related to disciplines, such as, but not limited to, mathematics, science, engineering, medicine, business, etc., more efficiently than if the tasks were performed in another type of computing environment, such as an environment that required the user to develop code in a conventional programming language, such as C++, C, Fortran, Pascal, etc.

In an implementation, the text-based modeling environment may include a dynamically typed language that may be used to express problems and/or solutions in mathematical notations. For example, the modeling environment may use an array as a basic element, where the array may not require dimensioning. These arrays may be used to support array programming in that operations can apply to an entire set of values, such as values in an array. Array programming may allow array-based operations to be treated as a high-level programming technique or model that lets a programmer think and operate on whole aggregations of data without having to resort to explicit loops of individual non-array. Generally, an array may be represented by one or more dimensions (e.g., m×n×p, etc. where $0 \leq m \leq M$; $0 \leq n \leq N$; $0 \leq p \leq P$ etc.; and where M, N, P, etc. are predetermined by the TCE). Thus, for example, the array may not include any values, such as an empty array (e.g., array( ); a single value (e.g., a 1×1 array); two or more values (e.g., a m×n array, where $1 \leq m \leq M$ and $1 \leq n \leq N$); etc.

The modeling environment may further be adapted to perform matrix and/or vector formulations that may be used for data analysis, data visualization, application development, simulation, modeling, algorithm development, etc. These matrix and/or vector formulations may be used in many areas, such as statistics, finance, image processing, signal processing, control design, life sciences, education, discrete event analysis and/or design, state based analysis and/or design, etc.

In another example implementation, the TCE may be implemented in a graphically-based modeling environment using products such as, but not limited to; VisSim by Visual Solutions; LabView® by National Instruments; Dymola by Dynasim; SoftWIRE by Measurement Computing; WiT by DALSA Coreco; VEE Pro or SystemVue by Agilent; Vision Program Manager from PPT Vision; Khoros from Khoral Research; Gedae by Gedae, Inc.; Scicos from (INRIA); Virtuoso from Cadence; Rational Rose from IBM; Rhopsody or Tau from Telelogic; Ptolemy from the University of California at Berkeley; or aspects of a Unified Modeling Language (UML) or SysML environment.

FIG. 1A is a diagram illustrating an example system 100 that generates and/or executes type-specific code associated with a set of data types. As shown in FIG. 1A, system 100 may include a computing device 102 and a set of user devices 1 through 5. Computing device 102 may, for example, correspond to a desktop computer, a laptop computer, a tablet computer, a server device, etc. A user device may correspond to any device that is capable of executing code, such as a mobile wireless device, a smart phone, a desktop computer, a laptop computer, a tablet computer, etc. A user, associated with computing device 102, may use computing device 102 to generate, using conventional techniques, a first version of code (e.g., code version 1) associated with a first data type (e.g., single precision floating point, double precision floating point, high precision floating point, etc.). The conventional techniques may include specifying, within the code (e.g., hard coding), the first data type to be used when executing the code. Computing device 102 may, for example, provide the first version of the code to a first user device (e.g., user device 1) that is capable of executing code associated with the first data type. Similarly, computing device 102 may use the conventional techniques to generate a second version of the code (e.g., code version 2) associated with a second data type (e.g., signed fixed point, unsigned fixed point, etc.). Computing device 102 may, for example, provide the second version of the code to a second user device (e.g., user device 2) that is capable of executing code associated with the second data type.

Computing device 102 may, in a manner similar to that described above, generate other versions of the code, (e.g., code version 3, code version 4, and/or code version 5, respectively) associated with other data types (e.g., unsigned and/or signed integer; symbolic; GPU, distributed, and/or co-distributed array; etc., respectively). Computing device 102 may provide the one or more other versions of the code to one or more other user devices (e.g., user device 3, user device 4, user device 5, and/or user device 6, respectively) that are capable of executing the other versions of the code.

A symbolic data type may associate a value, a variable, etc. with one or more symbols (e.g., pi=3.14159 . . . , e= 2.71828 . . . , etc.) in a manner that enables code to be executed on a user device. An array data type may correspond to a data type associated with an array of values to be established when executing the code. A graphical processing unit (GPU) array data type may correspond to a data type that that enables the code to be executed by a set of GPUs and/or a set of user devices (e.g., user devices 5) in which a GPU exists.

When a particular version of the code (e.g., shaded box associated with code version 3) is modified by computing device 102 (e.g., shown as a dashed box labeled "modify"), the user may use the conventional techniques to cause other versions of the code (e.g., shown as dashed arrows labeled "modify") to be modified. Thus, using the conventional techniques, the user may expend time and/or resources to keep track of the modifications (e.g., using a spreadsheet, a database, etc.) and/or to ensure that each of the other versions of the code is similarly modified to maintain a consistent configuration across the versions of the code.

Figure 1B:
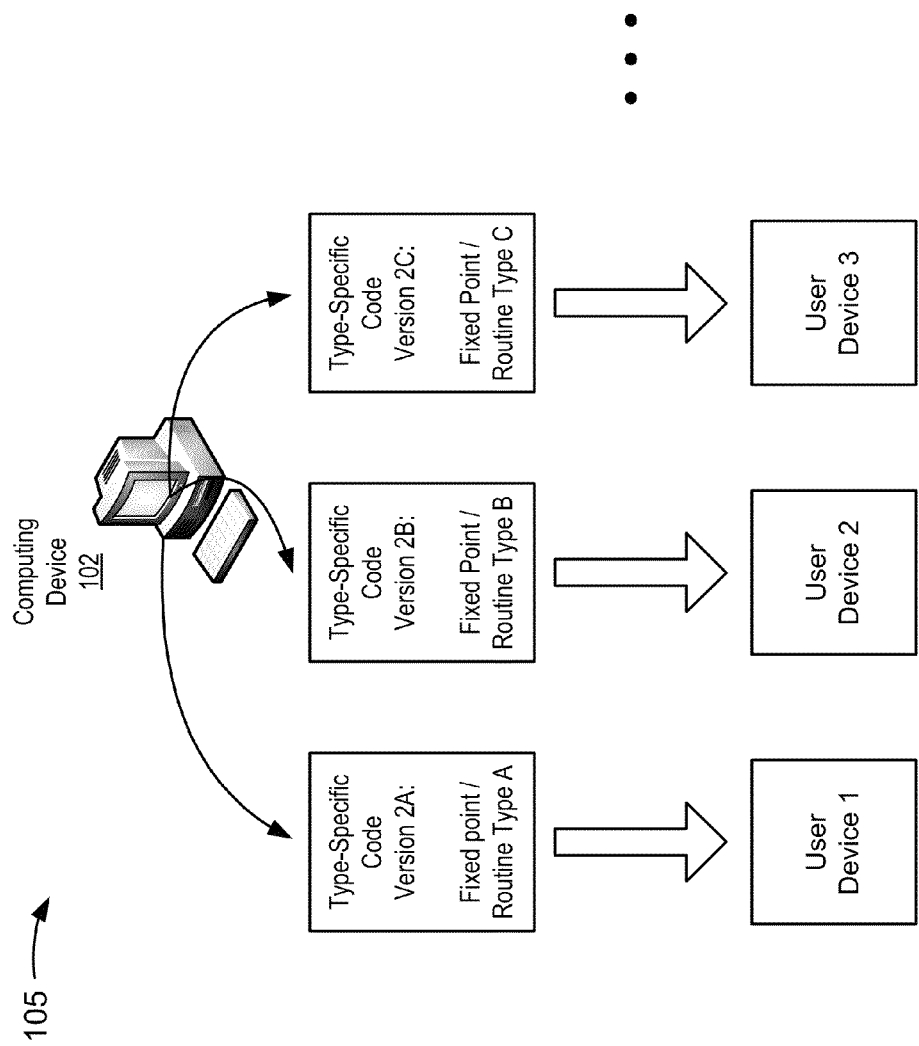

As shown in FIG. 1B, system 105 may include computing device 102 and a set of user devices 1 through 5. A user, associated with computing device 102, may, in a manner similar to that described above, use computing device 102 to generate the second version of type-specific code associated with the second data type, such as the fixed point data type (e.g., unsigned fix point, signed fix point, etc.). Additionally, or alternatively, computing device 102 may generate a version of the type-specific code (e.g., version 2A) that can be executed by the first user device (e.g., user device 1) associated with a first routine type (e.g., routine type A). Computing device 102 may also, or alternatively, generate other versions of the type-specific code (e.g., version 2B, 2C, etc.) that can be executed by other user devices (e.g., user device 2, 3, etc., respectively) associated with the routine type and/or other routine types (e.g., routine types B, C, etc., respectively). Additionally, or alternatively, the versions of the type-specific code (e.g., versions 2A, 2B, 2C, etc.) may represent different levels of computing accuracy, different run times, different levels of efficiency when being executed (e.g., power usage, resource usage, etc.), etc.

Additionally, or alternatively, computing device 102 may generate other versions of the type-specific code, that can be executed by the first user device (e.g., user device 1), based on a first routine type (e.g., routine type A) and a first data type; the first routine type and a second data type, the first routine type and a third data type; etc.

Thus, as described above, a variety of versions of the type-specific code may be generated for a particular user device based on the different data types and/or routine types. The user may, in a manner similar to that described above with respect to FIG. 1A, modify one or more versions of the type-specific code and may, using the conventional techniques, expend time and/or resources to keep track of the modifications and/or to ensure that each of the other versions of the code is similarly modified to maintain a consistent configuration across the versions of the code.

Figure 1C:
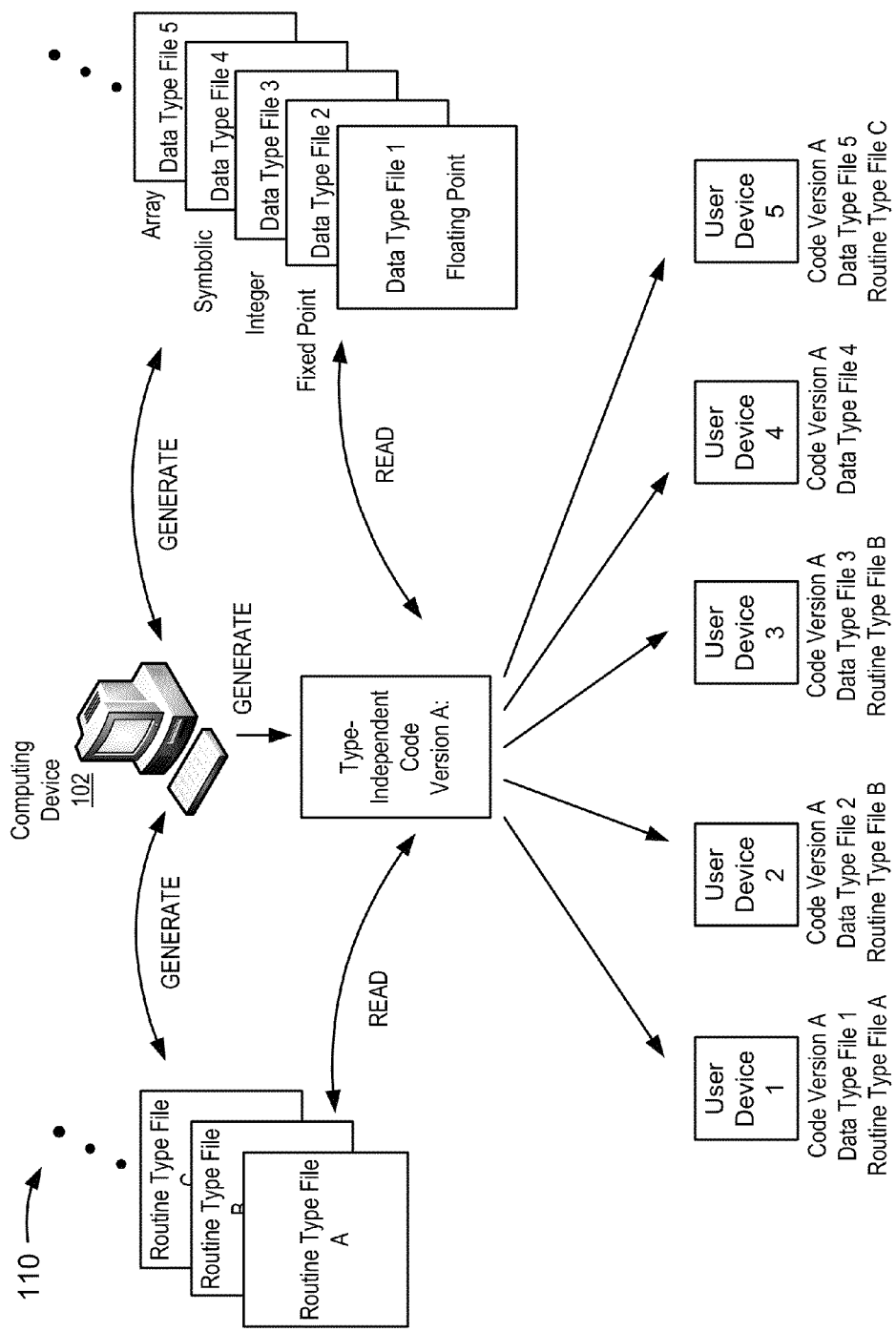

FIGS. 1C and 1D are diagrams of an example overview 110 of an implementation described herein. As shown in FIG. 1C, example overview 110 may include a computing device that generates type-independent code (e.g., code version A: type-independent). The type-independent code may not include data type information and/or routine type information. The type-independent code may include instructions that, when executed, cause computing device 102 to obtain data type information that is not associated with the type-independent code. The type-independent code may also, or alternatively, include instructions that, when executed, cause computing device 102 to obtain routine type information that is not associated with the type-independent code.

Additionally, or alternatively, computing device 102 may generate the data type information associated with the different data types described above with respect to FIG. 1A, and may store the data type information (e.g., in a data type file, in a data structure, etc.). Computing device 102 may, for example, create a first data type file (e.g., data type file 1) that includes the first data type information (e.g., associated with floating point); a second data type file (e.g., data type file 2) that includes the second data type information (e.g., fixed point); a third data type file (e.g., data type file 3) that includes the third data type information (e.g., integer); and so on.

Additionally, or alternatively, computing device 102 may generate the routine type information associated with the different routine types described above with respect to FIG. 1A, and may store the routine type information (e.g., in a routine type file, in a data structure, etc.). Computing device 102 may, for example, create a first routine type file (e.g., routine type file A) that includes the first routine type information (e.g., associated with a first user device, a first architectural standard, a first version of a routine, etc.); a second routine type file (e.g., routine type file B) that includes the second routine type information (e.g., associated with a second user device, a second architectural standard, a second version of the routine, etc.); and so on.

Thus, computing device 102 may provide the same type-independent code to the set of user devices (e.g., user devices 1-5) to be executed. Additionally, or alternatively, computing device 102 may provide the first data type file (e.g., data type file 1) and/or the first routine type file (e.g., routine type file A) to the first user device (e.g., user device 1) that is capable of executing code associated with the first data type and/or the first routine type. Computing device 102 may also, or alternatively, provide the second data type file (e.g., data type file 2) and/or the second routine type file (e.g., routine type file B) to the second user device (e.g., user device 2) that is capable of executing code associated with the second data type and/or the second routine type. Computing device 102 may provide a variety of combinations of data type files and/or routine type files to a particular user device.

In one example, computing device 102 may transform type-independent code and/or code included in data type information and/or routine type information, associated with a first format (e.g., as a proprietary format, etc.), to generated code intended for running on a particular user device. The generated code may conform to a second format, such as, for example, C++ code, hardware description language (HDL) code, etc. Each user device may execute the type-independent code based on a respective data type information and/or routine type information. The type-independent code may simplify modifying and/or managing the configuration of the type-independent code relative to modifying and/or managing the configuration of the set of versions of the type-specific code described above with respect to FIGS. 1A and 1B.

As shown in FIG. 1D, computing device 102 may transform type-independent code to a type-specific code that can be executed by a user device. For example, computing device 102 may modify a type-independent code 122 using information 124 to generate a type-specific code 126. Information 124 may, for example, include data type information read from one of the data type files, such as the third data type file (e.g., data type file 3 associated with an integer data type) and/or routine type information obtained from one of the routine type files, such as a second routine type file (e.g., routine type file B). In one example, information 124 may be stored in a file and/or data structure that includes a combination of the third data type information and/or the second routine type information. Computing device 102 may, based on the modified type-independent code, generate type-specific code 126 that includes the third data type information and/or the second routine type information. Computing device 102 may execute type-specific code 126 to determine whether type-specific code 126 can be executed on the third user device and may modify the third data type information and/or the second routine type information to generate an execute type-specific code 128 that can be executed by the third user device. Computing device 102 may provide executable type-specific code to the third user device.

FIG. 2 is a diagram of an example environment 200 in which systems and/or methods, described herein, may be implemented. As illustrated, environment 200 may include a computing device 102, and a group of user devices 215-1 through 215-N (where N≥1) (hereinafter referred to collectively as "user devices 215" and individually as "user device 215"). While FIG. 2 includes particular devices, in alternative implementations, environment 200 may include additional devices, fewer devices, different devices, or differently arranged devices than depicted in FIG. 2.

Computing device 102 may include one or more devices that gather, process, search, store, and/or provide information in a manner similar to that described herein. For example, computing device 102 may include a server, a workstation, a mainframe, a computer (e.g., a desktop computer, a laptop computer, a tablet computer, etc.), and/or some other type of computational device. Computing device 102 may generate, compile, and/or execute code, such as type-specific code and/or type-independent code. Computing device 102 may also, or alternatively, transform type-specific code to type-independent code and may generate data type information and/or routine type information obtained from the type-specific code. Computing device 102 may also, or alternatively, transform type-independent code to type-specific code using particular data type information and/or routine type information.

Computing device 102 may host a TCE 210. TCE 210 may include hardware-based logic and/or a combination of hardware and software-based logic that provides a computing environment. TCE 210 may permit a user to perform tasks related to a discipline or a domain. For example, TCE 210 may pertain to mathematics, science, engineering, medicine, business, and/or another type of discipline or domain in a manner similar to that described above.

User device 215 may include one or more devices capable of communicating with computing device 102. For example, user device 215 may include a personal computer, a laptop computer, a tablet computer, a wireless mobile device, a smart phone, or another type of user device that is capable of executing code. User device 215 may execute code that is generated by computing device 102. For example, user device 215 may be capable of executing code associated with a particular data type and/or routine type. In one example, user device 215 may receive, from computing device 102, type-specific code associated with the particular data type and/or routine type and may execute the type-specific code. User device 215 may also, or alternatively, receive type-independent code from computing device 102 and may execute the type-independent code using data type information associated with the particular data type and/or routine type information associated with the particular routine type.

Figure 3:
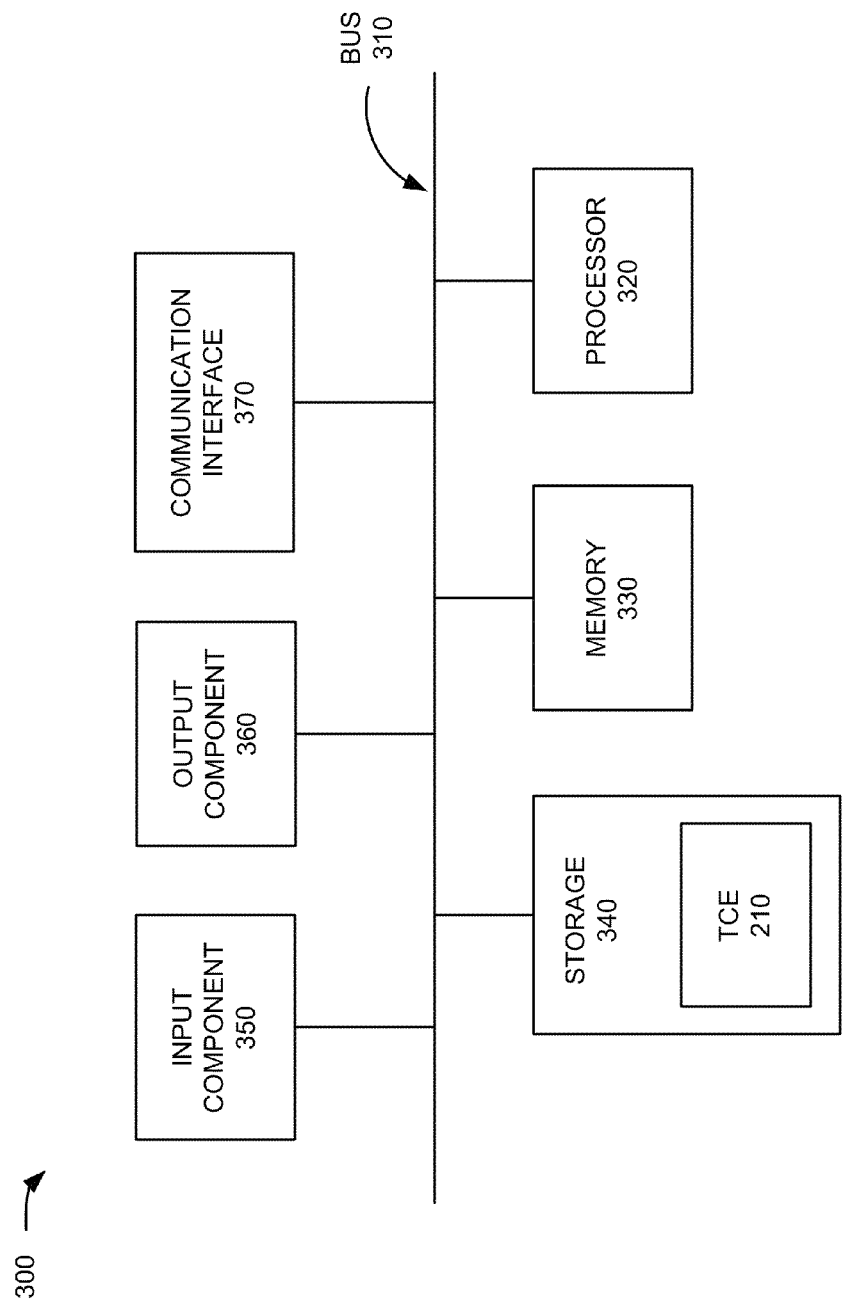
FIG. 3 is a diagram of example components of one or more devices of FIG. 2 according to one or more implementations described herein.

FIG. 3 is a diagram of an example device 300 that may correspond to computing device 102 and/or user device 215. Alternatively, each of computing device 102 and/or user device 215 may include one or more devices 300. As shown in FIG. 3, device 300 may include bus 310, processor 320, memory 330, storage 340, input component 350, output component 360, and/or communication interface 370. In other implementations, device 300 may include fewer components, additional components, different components, and/or a different arrangement of components than those depicted in FIG. 3. Additionally, or alternatively, a component of device 300 may perform an act described as being performed by another component of device 300.

Bus 310 may permit communication among the other components of device 300. For example, bus 310 may include a system bus, an address bus, a data bus, and/or a control bus. Bus 310 may also include bus drivers, bus arbiters, bus interfaces, and/or clocks.

Processor 320 may interpret and/or execute instructions. For example, processor 320 may include a general-purpose processor, a microprocessor, a data processor, a graphical processing unit (GPU), a co-processor, a network processor, an application specific integrated circuit (ASIC), an application specific instruction-set processor (ASIPs), a system-on-chip (SOC), a controller, a programmable logic device (PLD), a chipset, and/or a field programmable gate array (FPGA).

Memory 330 may store data and/or instructions related to the operation and use of device 300. For example, memory 330 may store data and/or instructions that may be configured to implement an implementation described herein. Memory 330 may include, for example, a random access memory (RAM), a dynamic random access memory (DRAM), a static random access memory (SRAM), a synchronous dynamic random access memory (SDRAM), a ferroelectric random access memory (FRAM), a read only memory (ROM), a programmable read only memory (PROM), an erasable programmable read only memory (EPROM), an electrically erasable programmable read only memory (EEPROM), and/or a flash memory.

Storage 340 may store data and/or software related to the operation and use of device 300. For example, storage 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive. Memory 330 and/or storage 340 may also include a storing device external to and/or removable from device 300, such as a Universal Serial Bus (USB) memory stick, a hard disk, etc. In an implementation, as illustrated, storage 340 may store TCE 210.

Input component 350 may permit the user and/or another device to input information into device 300. For example, input component 350 may include a keyboard, a keypad, a mouse, a display (e.g., a touch screen), a touchpad, a button, a switch, a microphone, a camera, an accelerometer, a gyroscope, neural interface logic, voice recognition logic, an input port, and/or some other type of input component. Output component 360 may permit device 300 to output information to the user and/or another device. For example, output component 360 may include a display, a speaker, a light emitting diode (LED), a haptic device, a tactile device, an output port, and/or some other type of output component.

Communication interface 370 may permit device 300 to communicate with other devices, networks, and/or systems. Communication interface 370 may include a transceiver-like component. For example, communication interface 370 may include an Ethernet interface, an optical interface, a coaxial interface, a radio interface, and/or some other type of wireless and/or wired interface.

As will be described in detail below, device 300 may perform certain operations relating to implementations described herein. Device 300 may perform these operations in response to processor 320 executing software instructions (e.g., computer program(s)) contained in a computer-readable medium, such as main memory 330 and/or storage device 350. A computer-readable medium may be defined as a non-transitory memory device. A memory device may include space within a single physical memory device or spread across multiple physical memory devices. The software instructions may be read into main memory 330 from another computer-readable medium, such as storage device 350, or from another device via communication interface 380. The software instructions contained in main memory 330 may cause processor 320 to perform processes described herein. Alternatively, hardwired circuitry may be used in place of or in combination with software instructions to implement processes described herein. Thus, implementations described herein are not limited to any specific combination of hardware circuitry and software.

FIG. 4A is a diagram of example type-specific code 400 (hereinafter referred to as "code 400"). As illustrated in FIG.

4A, code 400 may include lines of code 405 (hereinafter referred to collectively as "lines of code 405" and individually as a "line of code 405"), a set of variables 410 (hereinafter referred to collectively as "variables 410" and individually as a "variable 410"), and a set of routines 415 (hereinafter referred to collectively as "routines 415" and individually as a "routine 415").

Line of code 405 may include one or more variables 410 and/or one or more routines 415. Line of code 405 may also, or alternatively, include operators (e.g., +, −, *, etc.) that enable operations to be performed, based on variables 410 and/or routines 415, when line of code 405 is executed, such as through performance of addition, multiplication, subtraction, etc. operations. Line of code 405 may also, or alternatively, include operators (e.g., =, ≅, ≠, ≥, etc.) that identify relationships between variables 405, routines 415, or some combination thereof. Line of code 405 may also include text that describes one or more lines of code (e.g., usually proceeded by a % symbol or some other symbol and/or character). Variable 410 may correspond to a value and/or an array of values. Variable 410 may be associated with a particular data type (e.g., a floating point data type, a fixed point data type, an integer data type, a symbolic data type, an array data type, etc.). Routine 415 may enable an act or operation to be performed when line of code 405, with which routine 415 is associated, is executed by computing device 102 and/or user device 215. Routine 415 may be associated with a particular data type and/or may be executed based on variables 410 associated with the particular data type. Routine 415 may also, or alternatively, be associated with a particular routine type and may be executed by user device 215 that is based on the particular routine type and/or by computing device 102 emulating the particular routine type and/or a particular device architecture.

Code 400 may be associated with a data type. In one example, the data type may not be explicitly specified within one or more lines of code 405, which may cause computing device 102 to associate a default data type with one or more lines of code 405 within code 400. The default data type may be predetermined by computing device 102, TCE 210, and/or a user of computing device 102 and/or TCE 210. Assume, in this example, that the default data type corresponds to a floating point data type. While code 400 is described as being associated with a floating point data type, as the default data type, in some other implementations, code 400 may be associated with a default data type that is different than the floating point data type (e.g., a fixed point data type, an integer data type, a symbolic data type, an array data type, etc.).

Computing device 102 may, for example, associate the particular data type with one or more variables 410 and/or routines 415 associated with line of code 405. Thus, computing device 102 may, when executing line of code 405, store and/or operate on a value, associated with variable 410, based on the particular data type. In one example, for a particular line of code 405 (e.g., associated with the $54^{th}$ line of code: framesize=length(signal_in)), computing device 405 may associate the default data type with one or more variables 410 (e.g., framesize and/or signal_in) included within the particular line of code 405. Additionally, or alternatively, computing device 102 may associate the default data type with routine 415 (e.g., length) that is included within the particular line of code 405. Thus, data type information, associated with the particular data type, for the particular line of code 405, may identify the particular line of code 405 (e.g., 54), the one or more variables 410 (e.g., framesize and/or signal_in) and/or routines 415 (e.g., length), and/or information identifying the particular data type (e.g., the default data type).

FIG. 4B is a diagram of example type-specific code 420 (hereinafter referred to as "code 420"). As illustrated in FIG. 4B, code 420 may include lines of code 405, a set of variables 410, and a set of routines 415, as described above with respect to FIG. 4A, as well as a set of data type indications 425 (hereinafter referred to collectively as "indications 425" and individually as "indication 425") and a set of indication values 430 (hereinafter referred to collectively as "indication values 430" and individually as "indication value 430").

Indication 425 may identify a data type that is to be associated with variable 410 and/or routine 415. For example, indication 425 (e.g., shown as fi) may indicate that variable 410 (e.g., filterlength) is to be associated with a fixed point data type. While code 420 includes indication 425 that is described as being associated with a fixed point data type, in some other implementations, code 420 may include indications 425 associated with data types other than the fixed point data type (e.g., a floating point data type, a fixed point data type, an integer data type, a symbolic data type, an array data type, etc.). Indication values 430 may specify one or more parameters associated with the data type identified by indication 425.

By way of example, code 420 may include a first line of code 405 (e.g., the $78^{th}$ line of code: Filterlength=fi(32, 0, 6, 0) that includes indication 425 (e.g., fi) that associates a first variable 410 (e.g., Filterlength), with a fixed-point data type. The first line of code 405 may also, or alternatively, include indication values 430, associated with indication 425, such as, for example, a first parameter (e.g., 32) that specifies a value of a fixed point data type that is to be associated with the first variable 410. Indication values 430 may also, or alternatively, include a second parameter (e.g., 0), associated with indication values 430, that specifies whether the fixed point data type may be positive or negative. A first value (e.g., 0 or some other first value) may indicate that only positive fixed point values are to be associated with variable 410 and/or routine 415. A second value (e.g., 1 or some other second value) may indicate that positive and/or negative fixed point values are to be associated with variable 410 and/or routine 415. Indication values 430 may also, or alternatively, include a third parameter that identifies a first quantity of bits (e.g., 6), identified by the first parameter, to be allocated to the first variable 410 and/or a fourth parameter that identifies a second quantity of bits (e.g., 0), identified by the first parameter, that are to be allocated, as fractional bits, to the first variable 410. The fractional bits may, for example, correspond to fixed point values that are less than one (e.g., such as to represent cents when variable 410 corresponds to currency, etc.).

Additionally, or alternatively, code 420 may include a second line of code 405 (e.g., the $86^{th}$ line of code: weights=fi (zeros(Filterlength, 1), 1, 16, 16)) that includes indication 425 (e.g., fi) that associates a second variable 410 (e.g., weights) and/or a first routine 415 (e.g., zeros), with the fixed-point data type. The zeros routine 415 may, when executed, cause computing device 102 to create a matrix of zeros (e.g., of dimensions Filterlength), within a memory, that can be used to store fixed point values associated with the weights variable 410. Second line of code 405 may also, or alternatively, include indication values 430 that specify parameters associated with the first routine 415. While routine 415 is described herein as corresponding to the zeros routine, in another implementation routine 415 may correspond to a different array-creation routine (e.g., cast, ones, eye, nan, rand, randn, randi, inf, true, false, spalloc, speye, sprand, sprandn, colon, linspace, logspace, etc.).

A first parameter (e.g., zeros(Filterlength, 1)) may indicate a value, associated with the matrix, that can be used to execute the first routine 415. A second parameter (e.g., 1) may specify that the first routine 415 may be associated with positive and/or negative values 410. A third parameter may identify a first quantity of bits (e.g., 16) to be allocated to the first routine 415 when executed. A fourth parameter may identify a second quantity of bits (e.g., 16) that are to be allocated, as fractional bits, to the first routine 415.

First routine 415 is described above as being associated with the zeros routine 415 for explanatory purposes. In other implementations, routine 415 may be associated with routines other than zeros.

First routine 415 may also, or alternatively, represent a first version of first routine 415 that can be executed based on a first routine type. Additionally, or alternatively, first routine 415 may represent a second version of the first routine 415 that may be executed based on a second, different routine type. For example, the second version of first routine 415, when executed, may operate based on a different level of accuracy than the first version of first routine 415, a different run time than the first version of first routine 415, use a different quantity of resources than the first version of first routine 415, etc.

Code 420 may include other indications 425 and/or indication values 430 for each line of code 405 that includes one or more routines 415. Additionally, or alternatively, data type information, associated with the fixed point data type, for the second line of code 405 may identify the second line of code 405 (e.g., 78), the second variable 410 (e.g., weights), the first routine 415 (e.g., zeros), and/or information identifying the fixed point data type based on indication 425 (e.g., fi) and/or indication values 430 (e.g., zeros(Filterlength, 1), 1, 16, 16)).

FIG. 4C is a diagram of example type-independent code 450 (hereinafter referred to as "code 450"). As illustrated in FIG. 4C, code 450 may include lines of code 405, a set of variables 410, and a set of routines 415, as described above with respect to FIGS. 4A and 4B, as well as a data type variable 455, a data structure identifier 457, a set of data type instructions 460 (hereinafter referred to collectively as "instructions 460" and individually as "instruction 460"), and a set of instruction identifiers 465 (hereinafter referred to collectively as "identifiers 465" and individually as "identifier 465").

Type variable 455 may correspond to a value (e.g., T) associated with particular data type information and/or routine type to be used to execute code 450. Data structure identifier 457 may identify the particular data type, particular routine type information, and/or a data structure (e.g., a table, a file, a memory location, etc.) in which the particular data type information and/or particular routine type information is stored (e.g., shown as "master DTF( )"). For example, a first line of code 405 (e.g., T=masterDTF( ) as shown by dashed box 452)), associated with code 450, may identify a data structure from which the particular data type information, to be used to execute code 450, can be obtained.

Instruction 460 may indicate that data type information is to be obtained when executing a particular line of code 405 that includes instruction 460. Identifier 465 may identify an item, an entry, a variable, etc., associated with data type variable 455, that corresponds to the data structure (e.g., identified by data structure identifier 457), from which a portion of the particular data type information can be obtained. The portion of the particular data type information may be associated with variable 410 and/or routine 415 that is included within the particular line of code 405.

By way of example, code 450 may include a first line of code 405 (e.g., the 83$^{rd}$ line of code: mu=cast(2^(−12),'like', T.mu) as shown by dashed box 470) that includes instruction 460 (e.g., shown as "cast"). Instruction 460 may indicate that data type information, associated with variable 410 (e.g., mu) is to be obtained. Instruction 460 may also, or alternatively, include a term or syntax (e.g., shown as "like",) that causes computing device 102 to associate a parameter (e.g., 2^(−12)), associated with variable 410, with a first identifier 465 (e.g., T.mu) that corresponds to a first portion of data type information stored with a data structure, file, memory location, etc. identified by data structure identifier 457. The first identifier 465 may, for example, correspond to a first entry within the data structure, identified by identifier 457, from which the first portion of the data type information can be obtained and/or associated with the parameter.

Additionally, or alternatively, code 450 may include a second line of code 405 (e.g., the 88$^{th}$ line of code: weights=zeros (Filterlength, 1, 'like', T.weights) as shown by dashed box 475) that includes a second identifier 465, associated with routine 415 (e.g., zeros), that is included within the second line of code 405. In this example, a second instruction 460 may include the particular syntax or term (e.g., 'like', and/or some other syntax, such as 'type_of', 'type of', 'matching', 'prototype', 'sameas', etc.). In a manner similar to that described above, the second instruction 460 may include the particular syntax or term that causes computing device 102 to associate a parameter (e.g., Filterlength, 1) with a second identifier 465 (e.g., T.weights) associated with a second portion of the data type information. The second identifier 465 may, for example, correspond to a second entry within the data structure, identified by data structure identifier 457, from which the second portion of the data type information can be obtained and/or associated with the parameter.

Code 450 may include other instructions 460 and/or identifiers 465 for each line of code 405 that includes one or more variables 410 and/or routines 415 (e.g., as shown in dashed boxes 480-495).

In the description above, code 400 of FIG. 4A, code 420 of FIG. 4B, and code 450 of FIG. 4C are described in the context of lines of code 405 that include one or more of variables 410, and/or routines 415, data type indications 425, instructions 460, etc. Additionally, or alternatively, code 400 (FIG. 4A), code 420 (FIG. 4B), and/or code 450 (FIG. 4C) may include one or more sequences of code. A sequence of code may include one or more of variables 410, and/or routines 415, data type indications 425, instructions 460, program statements, declarations, operations, routine calls, or any other syntactic construct defined by a programming language on which code 400 (FIG. 4A), code 420 (FIG. 4B), and/or code 450 (FIG. 4C) are based. Such sequences may be included in a program listing or program editor on one or more lines of code 405. In some cases, two or more sequences may appear on a same line of code 405.

Figure 5:
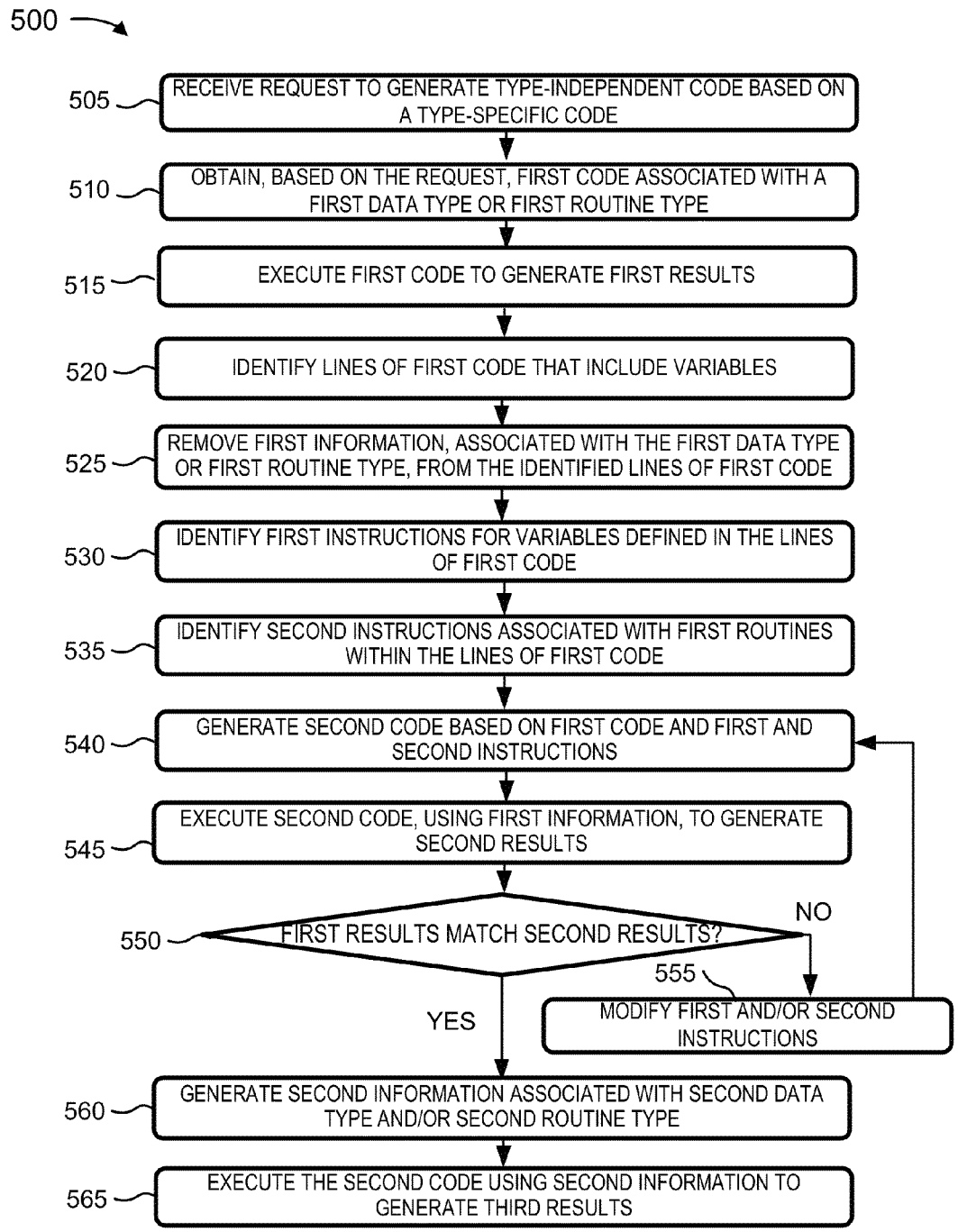
FIG. 5 is a flow chart of an example process for creating type-independent code based on type-specific code.

FIG. 5 is a flow chart of an example process 500 for creating type-independent code based on type-specific code. In one implementation, process 500 may be performed by computing device 102. Additionally, or alternatively, process 500 may be performed by a device, or group of devices, separate from, or in combination with, computing device 102. FIGS. 6A-6F are diagrams of example data structures 600-690, respectively, that store data type information and/or routine type information used when executing type-independent code. In the description below, all or a portion of process 500 will be described with references to data structures 600-690 of FIGS. 6A-6G, respectively.

The description below describes type-specific code, associated with a fixed point data type, being transformed to type-independent code for explanatory purposes. In other implementations, the type-specific code associated with a data type other than the fixed point data type (e.g., such as a floating point data type, a integer data type, a symbolic data type, an array data type, etc.) may be transformed to the type-independent code. Additionally, or alternatively, data structures 600-690, of FIGS. 6A-6G, may represent data structures, tables, files, etc. that are stored in computing device 102 and/or user device 215.

As shown in FIG. 5, process 500 may include receiving a request to generate type-independent code based on a type-specific code (block 505) and obtaining, in response to the request, first code associated with first data types and/or a first routine type (block 510). For example, a user may desire to generate type-independent code from existing type-specific code and may provide a request, to computing device 102, to obtain first code that corresponds to a type-specific code (e.g., code 400 of FIG. 4A or code 420 of FIG. 4B) associated with a first data type (e.g., a floating point data type, a fixed point data type, a integer data type, a symbolic data type, an array data type, etc.) and/or a first routine type (e.g., associated with a particular type of user device 210, algorithmic implementation, etc.). Computing device 102 may receive the request and may, in response to the request, retrieve the first code from a memory associated with computing device 102.

As also shown in FIG. 5, process 500 may include executing the first code to generate first results (block 515). For example, computing device 102 may execute the first code to generate first results. In one example, computing device 102 may obtain input values (e.g., from an input file, a data structure, etc.) and may execute the first code based on the input values. The input values may correspond to test data or some other data that enables the first code, when executed, to generate the first results.

As further shown in FIG. 5, process 500 may include identifying one or more lines of the first code that include variables (block 520) and removing first information, associated with the first data type, from the identified lines of the first code (block 525). For example, computing device 102 may identify one or more lines of code 405, associated with the first code, in which variables 410 and/or routines 415 are included. In one example, computing device 102 may identify the one or more lines of code 405 where variables 415 are first defined within the first code. Computing device 102 may also, or alternatively, receive selection of one or more lines of code 405 from an operator of computing device 102 and may identify the one or more lines of code 405 based on the selection of the one or more lines of code 405. Computing device 102 may also, or alternatively, remove first information, from an identified line of code 405, associated with the first data type and/or the first routine type. The first information may, for example, correspond to an indication (e.g., indication 425 of FIG. 4B), associated with variable 410 and/or routine 415 within the identified line of code 405, that corresponds to the first data type. The first information may also, or alternatively, correspond to one or more indication values (e.g., indication values 430 of FIG. 4B) that identifies parameters associated with the first data type. For example, computing device 102 may identify a first line of code 405 (e.g., the 81$^{st}$ line of code: mu=fi(2^(-12), 0, 16, 27) of FIG. 4B) and may remove the first information, associated with the first data type, from the first line of code 405 (e.g., resulting in a mu=2^(-12)). In this example, removing the first information may cause the first line of code 405 to be converted from an explicit data type (e.g., associated with the fixed point data type) to a default data type. Computing device 102 may store the first information in a data type file and/or data structure.

Additionally, or alternatively, when an identified line of code 405 does not include first information, such as when the data type corresponds to a default data type (e.g., the 81$^{st}$ line of code: mu=2^(-12) of FIG. 4A), computing device 102 may generate first information that corresponds to the default data type (e.g., floating point data type and/or some other default data type). Additionally, or alternatively, computing device 102 may identify line of code 405 that includes a routine 415 associated with a first routine type (e.g., y=sin(x)) that can be executed by the particular user device 215. Computing device 102 may remove first information, from line of code 405, that corresponds to the first routine type. In this example, the first information may identify a routine type associated with particular user device 215 and/or a data type that corresponds to first routine type.

Computing device 102 may store the first information, associated with the first data type and/or the first routine type, in one or more data structures, tables, files, etc. FIG. 6A is a diagram of data structure 600 that stores first data type information associated with the first information. As shown in FIG. 6A, data structure 600 may include a collection of entries, such as a routine entry 605, a data type override entry 610, and a set of assignment entries 615 (hereinafter referred to collectively as "assignment entries 615" and individually as "assignment entry 615"). Particular entries, shown with respect to data structure 600, are included for explanatory purposes. In other implementations, there may be additional entries, fewer entries, different entries and/or differently arranged entries than are shown with respect to FIG. 6A. In one example, the entries may store code that can be executed by computing device 102 and/or user device 215.

Routine entry 605 may include information that identifies a routine associated with a first data type. For example, routine entry 605 may include information that identifies an output (e.g., Routine T) that corresponds to a routine (e.g., single types( ) associated with the a data structure that stores information associated with a first data type, such as, in this example, a single precision floating point data type. Data type override entry 610 may include information that identifies conditional data types that may enable the first data type to be overridden. For example, if the data type override occurs, the first data type variable (e.g., prototype) may be associated with a different data type, such as, for example, a double precision floating point data type (e.g., double([ ])) and/or some other data type. If the data type override does not occur, then the data type variable may be associated with the first data type (e.g., single([ ])).

Assignment entry 615 may include information that associates variables 410, within the first code, with the first data type variable. For example, a first assignment entry 615 may store information that associates the first data type variable (e.g., prototype), with a first variable 410 (e.g., err) included within line of code 405 associated with the first code. The first entry (e.g., T.err) may be identified by an instruction (e.g., instruction 460 of FIG. 4C) within the line of code, to be described in greater detail below, that enables computing device 102 to associate the first data type with variable 410. Data structure 600 may, as described above, include other assignment entries 615 that associate the first data type variable (e.g., prototype) with other variables 410 within the first code (e.g., T.fifo=prototype; T.mu=prototype; etc.).

FIG. 6B is a diagram of data structure 620 that stores first routine type information associated with the first information. As shown in FIG. 6B, data structure 620 may include some or all of the fields 605-615 of FIG. 6A as well as routine type assignment entry 622. Routine entry 605 may, for example, include information that identifies a type variable (e.g., T) that corresponds to a routine (e.g., routine_type1( )) associated with a data structure that stores information associated with a first type of arithmetic routine (e.g., a polynomial approximation, a table lookup, etc.) and/or routine type.

Routine type entry 622 may include information that associates routine 415, within the first code, with the first routine type identified by routine entry 605. For example, a first assignment entry 622 may store information that associates the first arithmetic routine and/or the first routine type associated with first user device 215 (e.g., represented by device1( )), on which routine 415 within line of code 405 is based, with a routine type identifier (e.g., T.routinetype). The routine type identifier will be described in greater detail below with respect to FIG. 6G. Additionally, or alternatively, a second assignment entry 622 may store information that associates a variable used to execute routine 415 (e.g., x) with a data type (e.g., such as a floating point data type) associated with the first arithmetic routine and/or first routine type (e.g., T.x=device1.float( ).

Additionally, or alternatively, while data structures 600 and 620, are described as storing first information associated with a floating point data type, in other implementations, data structures 600 and/or 620 may store first information associated with other data types that are different than the floating point data type.

Returning to FIG. 5, process 500 may include identifying first instructions for variables defined within the lines of the first code (block 530). For example, computing device 102 may insert, within the first code, a first line of code 405 (e.g., T=master DTF( ) of FIG. 4C) that identifies a data structure from which data type information, associated with one or more different types of data types, can be obtained and/or accessed. Computing device 102 may also, or alternatively, generate first instructions 460, associated with the identified lines of code 405 from which the first information is removed. For example, in a second line of code 405, in which a first variable 410 is first defined within the first code, computing device 102 may insert a first instruction 460. First instruction 460 may, in a manner similar to that described above with respect to FIG. 4C, associate the first variable 410 with a first identifier. The first identifier may, in a manner similar to that described above with respect to FIG. 6A, identify an entry, within the data structure identified by the first line of code 405, that associates a data type with the first variable 410. In one example, a first variable (e.g., mu) may be associated with a first identifier (e.g., T.mu) based on the first instruction 460 inserted into the first line of code 405 (e.g., mu=cast(2^(−12), 'like',T.mu) of FIG. 4C). The first entry may also, or alternatively, be included in other data structures associated with other data types. Thus, the first variable 410 may be associated with other data types by identifying other data structures from which to obtain other data type information. Computing device 102 may also, or alternatively, generate other first instructions for each of the one or more lines of code from which the first data type information is removed.

As further shown in FIG. 5, process 500 may include identifying second instructions associated with first routines within the lines of first code (block 535). For example, computing device 102 may identify a first routine 415, within a third line of code 405 associated with the first code. Computing device 102 may determine that first routine 415 is associated with the first data type. Computing device 102 may also, or alternatively, identify first characteristics associated with first routine 415, such as, for example, a particular run time associated with first routine 415, a particular quantity of resources associated with executing first routine 415, a particular level of accuracy associated with first routine 415, etc. Computing device 102 may also, or alternatively, identify a version of first routine 415 associated with one or more data types that include or are different than the first data type, and/or one or more second characteristics that are different than the first characteristics. In one example, computing device 102 may insert, into the third line of code 405, a second instruction 460 to replace first routine 415 with the identified version of first routine 415. For example, assume that the third line of code 405 includes first routine 415 (e.g., y=sin(x)) that can be executed based on the first data type. Computing device 102 may replace first routine 415 with a version of first routine 415 associated with the one or more data types (e.g., y=sin(x, 'like', T.sin)). In this example, identifier 465 (e.g., that corresponds to T.sin), may correspond to an entry, within the data structure, that associates inputs to and/or outputs from the version of first routine 415, with a second data type of the one or more data types. Additionally, or alternatively, the identifier 465 (e.g., T.sin) may correspond to the version of first routine 415, within the data structure (e.g., T.sin=fixedpoint_polynomial_approximation( ); T.sin=tablelookup_sin( ); etc.), that approximates first routine 415 and/or corresponds to the second data type.

Additionally, or alternatively, computing device 102 may not replace first routine 415 with the version of first routine 415. In this example, computing device 102 may cause inputs to first routine 415 to remain associated with the first data type and may, in a manner similar to that described above with respect to block 530, insert another second instruction that associates outputs, of first routine 415, with the one or more data types identified by the data structure.

Additionally, or alternatively, computing device 102 may identify a second routine 415, within a fourth line of code 405 associated with the first code. Computing device 102 may, in a manner similar to that described above, identify first characteristics associated with second routine 415 (e.g., associated with run time, quantity of resources used when executing second routine 415, a particular level of accuracy, etc.). Based on the first characteristics associated with second routine 415, computing device 102 may identify a version of second routine 415 that is associated one or more routine types that enable the version of second routine 415 to be executed based on second characteristics that are different than the first characteristics. In one example, computing device 102 may insert, into the fourth line of code 405, another second instruction 460 to replace second routine 415 with the identified version of second routine 415.

For example, assume that the fourth line of code 405 includes second routine 415 (e.g., z=cos(x)) associated with a first routine type and/or the first characteristics. Computing device 102 may replace second routine 415 with the version of second routine 415 associated with a different routine type (e.g., z=cos(x, 'like', T.routinetype)). The different routine type may, for example, correspond to user device 215 that executes code using the different routine type and/or in a manner that conforms to the second characteristics. In this example, identifier 465 (e.g., T. routinetype), included within the version of second routine 415, may correspond to an entry, within a data structure, associated with the different routine type (e.g., T.routinetype=Routinetype( ). Thus, the fourth line of code, when executed, may cause the version of second routine 415 to be obtained and/or executed in a manner that conforms to the second characteristics. The version of second routine 415 may, when executed, cause an operation to be performed that computes second routine 415 in a different manner, such as, for example, using a table lookup (e.g., z=tablelookup_cos(x)); a polynomial approximation (e.g., z=polynomial_approximation_cos(x)); a version of second routine 415 associated with TCE 210 (e.g., z=builtin_cos(x), etc.); etc.

As also shown in FIG. 5, process 500 may include generating second code based on the first code, the first instructions, and the second instructions (block 540) and executing the second code, using the first information, to generate second results (block 545). For example, computing device 102 may generate second code based on the modified lines of code 405 from which the first information was removed and in which the first instructions and/or second instructions were inserted. Thus, the second code may include lines of code 405, from the first code, that were not changed and/or the modified lines of code.

Additionally, or alternatively, computing device 102 may execute the second code based on the first information, associated with the first data type, that was removed from the one or more lines of code 405. Computing device 102 may generate second results as a result of executing the second code based on the first information. In one example, computing device 102 may obtain input values (e.g., from an input file, a data structure, etc.) that were previously used to execute the first code and may execute the second code based on the input values. The input values may correspond to test data or some other data that enables the second code to be generated to produce the second results. The input values may, in one example, correspond to the first data type.

As further shown by FIG. 5, if the first results do not match the second results (block 550—NO), process 500 may include modifying the first instructions and/or the second instructions (block 555). For example, computing device 102 may compare the first results to the second results to determine whether the first results match the second results. When the first results do not match the second results, computing device 102 may modify one or more lines of code 405 associated with the second code. In one example, computing device may modify a first instruction 460 (e.g., associated with a particular variable 410), inserted into line of code 405. Computing device 102 may modify the first instruction when a result, obtained by executing line of code 405, does not match a result previously obtained when line of line of code 405, within the first code, was executed.

Additionally, or alternatively, computing device may modify a second instruction 460 (e.g., associated with a particular routine 415), inserted into another line of code 405. Computing device 102 may modify the second instruction when another result, obtained by executing the other line of code 405, does not match another result that was previously obtained when the other line of line of code 405, within the first code, was executed.

As yet further shown by FIG. 5, if the first results match the second results (block 550—YES), process 500 may include generating second information associated with a second data type and/or second routine type (block 560). For example, computing device 102 may compare the first results to the second results and may determine that the first results match the second results. When the first results match the second results, computing device 102 may generate second information, associated with a second data type that is different than the first data type, such as a signed and/or unsigned fixed point data type, a signed or unsigned integer data type, a symbolic data type, a GPU array signature type, a distributed and/or co-distributed array data type, etc. and/or some combination thereof. Computing device 102 may, for example, generate second information that associates variables 410 and/or routines 415, within the second code, with one or more second data types and/or one or more second routine types.

For example, as shown in FIG. 6C, a data structure 630 may store second information associated with a second data type. Data structure 630 may be stored in a memory associated with computing device 102. Data structure 630 may include a collection of entries, such as data type routine entry 605, data type override entry 610, and assignment entries 615, as described above with respect to FIG. 6A. Data structure 630 may also store a parameter entry 635 and another data type routine entry 640

Routine entry 605, in this example, may include information that identifies a type variable (e.g., T) that corresponds to a routine (e.g., FP_types ( )) associated with a data structure that stores information associated with a second data type, such as a fixed point data type. Data type override entry 610 may, in this example, associate a first data type variable (e.g., prototype) and/or a second data type variable (e.g., datatype) with a data type, such as, for example, a scaled double fixed point data type (e.g., 'scaleddouble') and/or a double precision floating point data type (e.g., double([ ])), respectively, when a data override occurs. If the data type override does not occur, the first data type variable and/or the second data type variable may be associated with the fixed point data type (e.g., 'fixed'), and/or a single precision floating point data type (e.g., single([ ])).

Assignment entry 615 may, in this example, store information that associates a first variable (e.g., err) included within a line of code within the first code with the second data type (e.g., fi([ ], 1, dfWL, dfFL, 'datatype', datatype, fimath, F)). The first entry (e.g., T.err) may be identified by an instruction (e.g., instruction 460 of FIG. 4C) within the line of code that enables computing device 102 to associate with second data type with the variable within the line of code.

Assignment entry 615 may, in this example, store information that associates the data a second variable (e.g., Filterlength) included within another line of code within the first code, with a third data type, such as an unsigned integer data type (e.g., uint32([ ])). The second entry (e.g., T.Filterlength) may be identified by an instruction (e.g., instruction 460 of FIG. 4C) within the other line of code that enables computing device 102 to associate the second data type with the second variable within the other line of code. Data structure 630 may, as described above, include other assignment entries 615 that associate other variables (e.g., fifo, mu, signal_in, signal_out, etc.) with the second data type, a third data type, and/or some other data type.

Parameter entry 635 may store information that identifies parameters associated with variables 410 and/or routines 415 identified within data structure 630. For example, parameter entry 635 may store a parameter associated with a quantity of bits (e.g., dfWL=16) permitted for variables 410 and/or routines 415 associated with the second code. Parameter entry 635 may also, or alternatively store a parameter associated with a quantity of fractional bits (e.g., dfFL=12) to be permitted for variables 410 and/or routines 415 associated with the second code. Data type routine entry 640 may identify one or more routines, associated with the second data type, that can be used to operate on variables 410 and/or routines 415 associated with the second code.

Computing device 102 may also, or alternatively, generate other data type information and may store the other data type information in one or more other data structures. For example, data structures 650, 660, and 680, of FIGS. 6D through 6F, respectively, may store other data type information associated with one or more other data types. Each of data structures 650, 660, and 680 may include some or all of the collection of entries as described above with respect to FIGS. 6A-6C.

Data structure 650 of FIG. 6D may store third information associated with a third data type. In this example, data structure 650 may include routine entry 605 that includes information that identifies a type variable (e.g., T) that corresponds to a routine (e.g., Symbolic_types ( )) associated with a data structure that stores information associated with a third data type, such as a symbolic data type. Assignment entry 615 may, in this example, store information that associates variables 410 (e.g., a, z, e, r, etc.), associated with the second code, with the third data type (e.g., T.a=sym('a'); T.z=sym ('z'); T.e=sym('e'); T.r=sym('r'); etc.).

Data structure 660 of FIG. 6E may store fourth information associated with a fourth data type. In this example, data structure 660 may include routine entry 605 that includes information that identifies a type variable (e.g., T) that corresponds to a routine (e.g., GPUArray_types ( )) associated with a data structure that stores information associated with a fourth data type, such as a GPU array data type. Assignment entry 615 may, in this example, store information that associates variables 410 (e.g., a, z, e, r, etc.), associated with the second code, with the fourth data type (e.g., T.a=gpuArray (0); T.z=sym('z'); T.e=sym('e'); T.r=sym('r'); etc.).

Data structure 680 of FIG. 6F may store fifth data type information associated with a combination of the first through the fourth data types and/or some other data type. In this example, data structure 680 may include a routine entry 605 that includes information that identifies a routine associated with a combination of data types, such as a floating point data type, a fixed point data type, an integer data type, a symbolic data type, a GPU array data type, etc. (e.g., Routine T=Mixed_types( ). Assignment entry 615 may, in this example, store information that associates variables 410 (e.g., a, z, e, r, etc.), associated with the second code, with the combination of data types, such as the first data type (e.g., T.a=fi([ ], 1, 24, 12)); a second data type (e.g., T.z=double([ ]) for double precision and T.e=single([ ]) for single precision); a third data type (e.g., T.r=int32([ ])); etc.).

Data structure 690 of FIG. 6G may store routine type information that corresponds to a routine type and/or arithmetic routine on which the second code is executed. In this example, data structure 690 may include a routine entry 605 that includes information that identifies a type variable (e.g., A) that corresponds to a routine (e.g., Routine_type2 ( )) associated with a data structure that stores information associated with a second routine type and/or arithmetic routine type. Routine type entry 622 may, in this example, include a routine type identifier (e.g., T.routinetype) that is identified within routine 415 associated with the second code (e.g., y=cos(x,'like',T.routinetype)). Routine type entry 622 may also, or alternatively, associate the routine type identifier with a second routine type and/or second type of arithmetic routine on which the second code is to be executed (e.g., shown as T.routinetype=routinetype2( ), where routinetype2( ) represents the second routine type and/or second type of arithmetic routine).

Routine type entry 622 may also, or alternatively, store information that associates variable 410 (e.g., x), within routine 415, with the second routine type and/or second type of arithmetic routine (e.g., T.x=routinetype2.fi( )). In this example, the second routine type and/or arithmetic routine may correspond to a fixed point data type. Additionally, or alternatively, the second routine type and/or arithmetic routine may correspond to other data types (e.g., T.x=routinetype2.int( ) for integer; T.x=routinetype2.GPUarray( ); etc.).

Particular entries, shown with respect to data structures 620-690, of FIGS. 6B-6F, respectively, are included for explanatory purposes. In other implementations, there may be additional entries, fewer entries, different entries and/or differently arranged entries than are shown with respect to FIGS. 6B-6F. In one example, the entries may store code that can be executed by computing device 102.

As still further shown in FIG. 5, process 500 may include executing the second code using the second information to generate third results (block 565). For example, computing device 102 may execute the second code using second information that is different than the first information. In one example, computing device 102 may execute the second code using second data type information, associated with a fixed point data type, obtained from a third data structure (e.g., data structure 630 of FIG. 6C). Additionally, or alternatively, computing device 102 may execute the second code using third data type information, associated with a symbolic data type, obtained from a fourth data structure (e.g., data structure 650 of FIG. 6D); fourth data type information, associated with an array data type (e.g., a GPU array, a distributed array, etc.), obtained from a fifth data structure (e.g., data structure 660 of FIG. 6E); a fifth data type, associated with a combination of some or all of the first through fifth data types and/or some other data type, obtained from a sixth data structure (e.g., data structure 680 of FIG. 6F); etc.

Computing device 102 may also, or alternatively, execute the second code using second information that includes second routine type information, associated with a second user device 215, obtained from a seventh data structure (e.g., data structure 690 of FIG. 6G); and/or other routine type information (e.g., associated with other user devices 215), obtained from one or more other data structures.

Thus, the second code may be executed with one or more combinations of data type information and/or routine type information. Computing device 102 may, for example, iteratively execute the second code using particular data type information in combination with different routine type information to identify optimum second information that is based on particular data type information and particular routine type information. Additionally, or alternatively, computing device 102 may iteratively execute the second code using particular routine type information in combination with different data type information to identify optimum second information that is based on the particular routine type information and particular data type information. The optimum second information may, for example, enable the second code to run faster, use fewer resources, provide more accurate results, etc. than other combinations of data type information and routine type information. Additionally, or alternatively, an operation of computing device 102 may modify the routine type information and/or the data type information to optimize a manner in which the second code is executed by computing device 102 and/or a particular user device 215.

Figure 7:
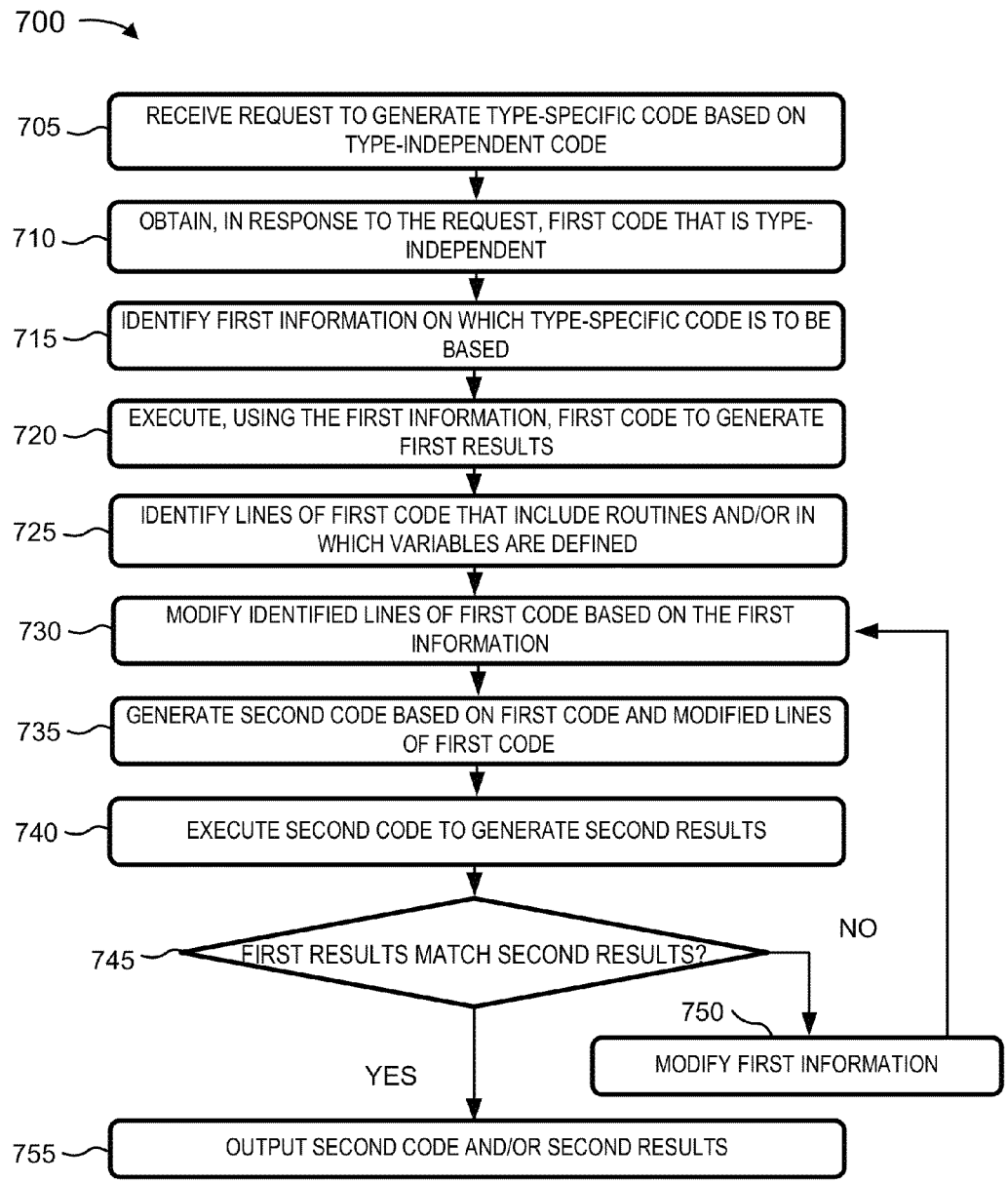
FIG. 7 is a flow chart of an example process for creating type-specific code based on type-independent code.

FIG. 7 is a flow chart of an example process 700 for creating type-specific code based on type-independent code. Additionally, or alternatively, process 700 may be performed by a device, or group of devices, separate from, or in combination with, computing device 102. The description below describes type-independent code being transformed to type-specific code associated with a fixed point data type for explanatory purposes. In other implementations, the type-independent code may be transformed to type-specific code associated with a data type other than the fixed point data type, such as, for example, a floating point data type, a integer data type, a symbolic data type, a GPU array data type, a distributed array data type, etc.

As shown in FIG. 7, process 700 may include receiving a request to generate type-specific code based on type-independent code (block 705) and obtaining, based on the request, first code that is type-independent (block 710). For example, a user may desire to generate type-specific code from existing type-independent code and may provide a request, to computing device 102, to obtain first code that corresponds to type-independent code (e.g., code 450 of FIG. 4C). Computing device 102 may receive the request and may, in response to the request, retrieve the first code from a memory associated with computing device 102.

As also shown in FIG. 7, process 700 may include identifying first information on which type-specific code is to be based (block 715) and executing, using the first information, the first code to generate first results (block 720). For example, computing device 102 may, based on the request, determine a data type on which the type-specific code is to be based. Computing device 102 may also, or alternatively, identify a data structure that stores data type information that corresponds to the determined data type. For example, when the data type corresponds to a first data type (e.g., a floating point data type), computing device 102 may identify first information, associated with the first data type, that is stored in a first data structure (e.g., from data structure 600 of FIG. 6A). When the data type corresponds to a second data type (e.g., a fixed point data type), computing device 102 may identify first information, associated with the second data type, that is stored in a third data structure (e.g., from data structure 630 of FIG. 6C). Computing device 102 may, thus, identify different data type information (e.g., associated with integer data type, a symbolic data type, a GPU array data type, etc.), that is stored in one or more other data structures (e.g., data structures 650, 660, 680, etc. of FIGS. 6D-6F, respectively), based on which data type the type-specific code is to be based.

Additionally, or alternatively, computing device 102 may, based on the request, determine a routine type on which the type-specific code is to be based. Computing device 102 may also, or alternatively, identify a data structure that stores routine type information that corresponds to the determined routine type. For example, when the routine type corresponds to a first routine type (e.g., associated with a first user device 215), computing device 102 may identify first information, associated with the first routine type, that is stored in a second data structure (e.g., data structure 620 of FIG. 6B). Computing device 102 may identify different routine type information (e.g., associated with other user devices 215, etc.), that is stored in one or more other data structures (e.g., data structure 690 of FIG. 6G, etc.), based on which routine type the type-specific code is to be based.

Computing device 102 may also, or alternatively, execute the first code using the first information. For example, computing device 102 may access a data structure that stores the identified data type information and/or a data structure that stores the identified routine type information. Computing device 102 may, in one example, obtain the first information from the data structures and may execute the first code, using the first information, to generate first results. Computing device 102 may also, or alternatively, execute one or more lines of code, stored within the data structures, to obtain the data type information and/or the routine type information that is used to execute the first code. In one example, computing device 102 may obtain input values (e.g., from an input file, a data structure, etc.) and may execute the first code based on the input values. The input values may correspond to test data or some other data that enables the first code, when executed, to generate the first results.

As further shown in FIG. 7, process 700 may include identifying lines of the first code that include routines and/or in which variables are defined (block 725) and modifying the identified lines of first code based on the first information (block 730). For example, computing device 102 may identify a line of code 405, associated with the first code (e.g., code 450 of FIG. 4C) that includes a data type routine (e.g., T=masterDTF( ) as shown by dashed box 452 of FIG. 4C) that is used to identify a data structure from which data type information is to be accessed. Computing device 102 may remove the identified line of code 405 that includes the data type routine.

Computing device 102 may also, or alternatively, identify lines of code 405, associated with the first code, that include variables 410. In one example, computing device 102 may identify a first line of code 405 in which variable 410 is first defined within the first code (e.g., mu=cast($2^{-12}$), 'like', T.mu) as shown by dashed box 470 of FIG. 4C). Computing device 102 may also, or alternatively, remove instruction 460 from the first identified line of code 405 (e.g., resulting in mu=$2^{-12}$)). Additionally, or alternatively, computing device 102 may insert data type information into the first identified line of code 405. For example, when the data type information corresponds to a fixed point data type, computing device 102 may modify the first identified line of code 405 by inserting data type information, into the first identified line of code 405, that associates variable 410 with the fixed point data type (e.g., the $81^{st}$ line of code: mu=fi($2^{-12}$), 0, 16, 27) of FIG. 4B). Additionally, or alternatively, computing device 102 may insert data type information into the first line of code 405 without removing instruction 460 (e.g., resulting in mu=cast($2^{-12}$), 'like', fi([ ], 0, 16, 27)).

Additionally, or alternatively, when type-specific code, to which the first code is being transformed, is to be associated with a default data type (e.g., a data type associated with computing device 102, TCE 210, and/or a particular user device 215, etc.), computing device 102 may not insert the data type information into the first identified line of code 405 and/or the second identified line of code 405.

Additionally, or alternatively, computing device 102 may identify lines of code 405 in which versions of routines 415 are included. In one example, computing device 102 may identify a second line of code 405 in which a first version of routine 415 (e.g., y=sin(x,'like',T.sin); y=sin(x,'like',T.routinetype); etc.) is first defined within the first code. The first version of routine 415 may, for example, may include an instruction indicating that a data structure is to be accessed to obtain data type information and/or routine type information with which to execute the first version of routine 415. Computing device 102 may, for example, remove information associated with the instruction, from the second identified line of code 405, and may replace the first version of routine 415 with a second version of routine 415. In one example, the second version of routine 415 may correspond to a table lookup (e.g., y=tablelookup_sin(x), etc) that, when executed, generates output that approximates outputs generated by the first version of routine 415. Additionally, or alternatively, the second version of routine 415 may correspond to a polynomial approximation of the first version of routine 415 (e.g., y=polynomialapproximation_sin(x), etc). Additionally, or alternatively, the first version of routine 415 may be replaced with a second version of routine 415 that is optimized to execute on a particular user device 215 (e.g., y=sin(x), where sin(x) is optimized for the particular user device 215)).

As yet further shown in FIG. 7, process 700 may include generating second code based on the first code and the modified lines of the first code (block 735) and executing the second code to generate second results (block 740). For example, computing device 102 may generate second code based on first lines of code 405 that are modified in the manner similar to that described above with respect to block 730. Additionally, or alternatively, the second code may be generated based on second lines of code 405, associated with the first code, that have not been modified.

Additionally, or alternatively, computing device 102 may execute the second code to generate second results. In one example, computing device 102 may obtain input values (e.g., from an input file, a data structure, etc.) and may execute the second code based on the input values. The input values may correspond to input values used to execute the first code to generate the first results.

As also shown in FIG. 7, if first results do not match second results (block 745—NO), process 700 may include modifying the first information (block 750). For example, computing device 102 may compare the first results to the second results to determine whether the first results match the second results. When the first results do not match the second results, computing device 102 may modify one or more lines of code associated with the second code. For example, computing device 102 may determine that a first result, associated with a line of first code, does not match a second result associated with a line of second code that corresponds to the line of first code. The first result, associated with the line of first code, may be obtained as a result of executing the first code and the second result, associated with the line of second code, may be obtained as a result of executing the second code. Additionally, or alternatively, computing device 102 may, in a manner similar to that described above with respect to block 555 of FIG. 5, modify the line of second code (e.g., by modifying data type information, routine type information, and/or a second version of routine 415 inserted into the second line of code) in a manner that, when executed, causes the second result to match the first result.

As further shown in FIG. 7, if first results match second results (block 745—YES), process 700 may include outputting the second code and/or the second results (block 755). For example, computing device 102 may determine that the first results match the second results based on the comparison of the first results to the second results. When the first results match the second results, computing device 102 may output the second code and/or the second results. In one example, computing device 102 may provide the second code to a particular user device 215 associate with a routine type that corresponds to the routine type information included within the first information.

Additionally, or alternatively, an operator may use computing device 102 to iteratively modify the first information to optimize the second code to execute on a particular type of user device 215. The second code may, for example, be optimized to reduce a run time associated with the second code, to reduce a quantity resources (e.g., CPU usage, memory usage, power usage, etc.), to increase accuracy associated with the second code, etc. Computing device 102 may also, or alternatively, generate an executable version of the second code and may provide the executable version of the second code to the particular user device 215.

Figure 8:
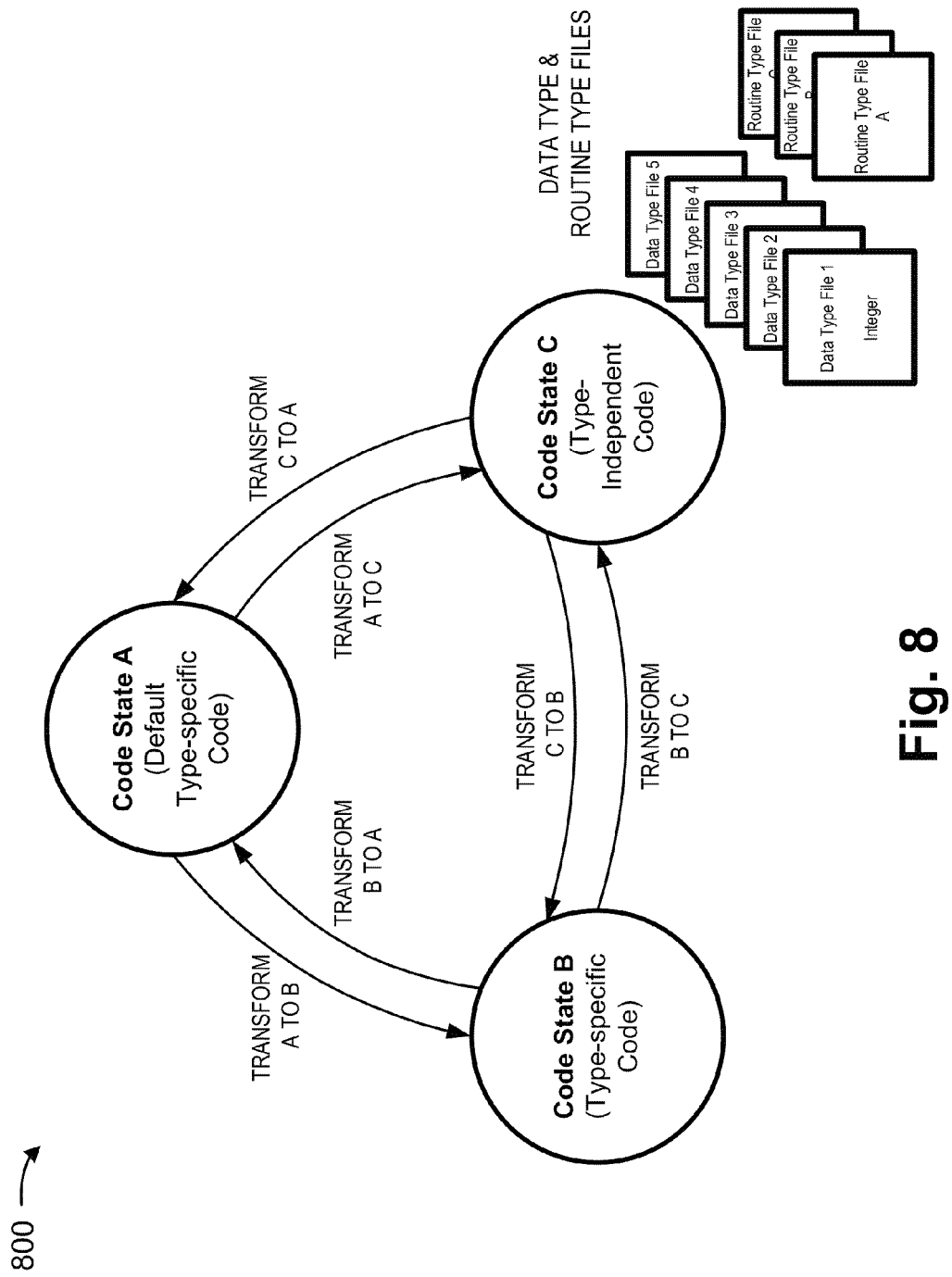
FIG. 8 is a diagram of example transformations between code states associated with type-independent code and/or type-specific code.

FIG. 8 is a diagram of example transformations 800 between code states associated with generated code, type-independent code, and/or type-specific code. As illustrated in FIG. 8, transformations 800 may identify a collection of code states, such as code state A, code state B, and code state C. Code state A may correspond to type-specific code that is developed and/or generated, by a user, using computing device 102. Code state A may, for example, correspond to type-specific code that was developed and/or generated based on a default data type and/or routine type (e.g., code 400 of FIG. 4A) associated with computing device 102, TCE 210, and/or user device 215.

Code state B may correspond to type-specific code (e.g., code 420 of FIG. 4B) that can be executed based on data type information and/or routine type information included within the type-specific code. The data type information and/or routine type information may be tailored to conform to a particular data type that is used by a particular user device 215 and/or a routine type on which the particular user device 215 is based, respectively.

Code state C may correspond to type-independent code that can be executed based on a data type and/or routine type (e.g., code 450 of FIG. 4C) that is not specified within the type-independent code. The data type and/or routine type may be derived from data type information and/or routine type information, respectively, stored in one or more files, data structures, etc.

Code, associated with a code state, may be transformed to code associated with another code state. For example, computing device 102 may transform first code, associated with a first code state (e.g., code state A) to second code associated with a second code state (e.g., code state B) (e.g., shown as "transform A to B") by inserting, into lines of code within the first code, data type information associated with a particular data type (e.g., floating point, fixed point, integer, symbolic, GPU array, routine type, etc.) and/or routine type information associated with a particular routine type (e.g., associated with a particular user device 215). Additionally, computing device 102 may transform second code, associated with the second code state (e.g., code state B) to first code associated with the first code state (e.g., shown as "transform B to A") by removing, from lines of code within the second code, data type information associated with a particular data type and/or routine type information associated with a particular routine type.

Computing device 102 may also, or alternatively, transform second code, associated with the second code state (e.g., code state B) to third code associated with a third code state (e.g., code state C) (e.g., shown as "transform B to C"). For example, computing device 102 may, in a manner similar to that described above with respect to FIG. 5, remove data type information and/or routine type information from the second code. Computing device 102 may also, or alternatively, insert instructions into the second code to create the third code. The instructions may, when executed, cause computing device 102 to obtain data type information and/or routine type information from one or more files, data structures, etc. to be used to execute the third code. Additionally, or alternatively, computing device 102 may transform third code, associated with the third code state, to second code associated with the second code state (e.g., shown as "transform C to B"). For example, computing device 102 may, in a manner similar to that described above with respect to FIG. 7, remove instructions from the third code. Computing device 102 may also, or alternatively, obtain data type information and/or routine type information (e.g., from one or more files, data structures, etc.) on which the second code is to be based. Computing device 102 may also, or alternatively, insert the data type information and/or routine type information into the third code to create the second code. In one example, computing device 102 may replace one or more routines, included within the third code, with different versions of the routines, identified by the data type information and/or routine type information, to be included within the second code. The inserted data type information and/or routine type information (e.g., including the versions of the routines) may enable the second code to be executed, by computing device 102, based on a data type and/or routine type identified by the data type information and/or routine type information, respectively.

Computing device 102 may also, or alternatively, transform first code, associated with the first code state (e.g., code state A) to third code associated with the third code state (e.g., code state C) (e.g., shown as "transform A to C"). For example, computing device 102 may, in a manner similar to that described above with respect to FIG. 5, insert instructions into the first code to create the third code. The instructions may, when executed, cause computing device 102 to obtain data type information and/or routine type information from one or more files, data structures, etc. that is used to execute the third code. Additionally, or alternatively, computing device 102 may transform third code, associated with the third code state to first code associated with the first code state (e.g., shown as "transform C to A"). For example, computing device 102 may, in a manner similar to that described above with respect to FIG. 7, remove instructions from the third code to create the first code. Removing the instructions may enable the first code to be executed, by computing device 102, based on a default data type associated with computing device 102, TCE 210, and/or an application used to generate, compile, and/or execute the first code.

Figure 9:
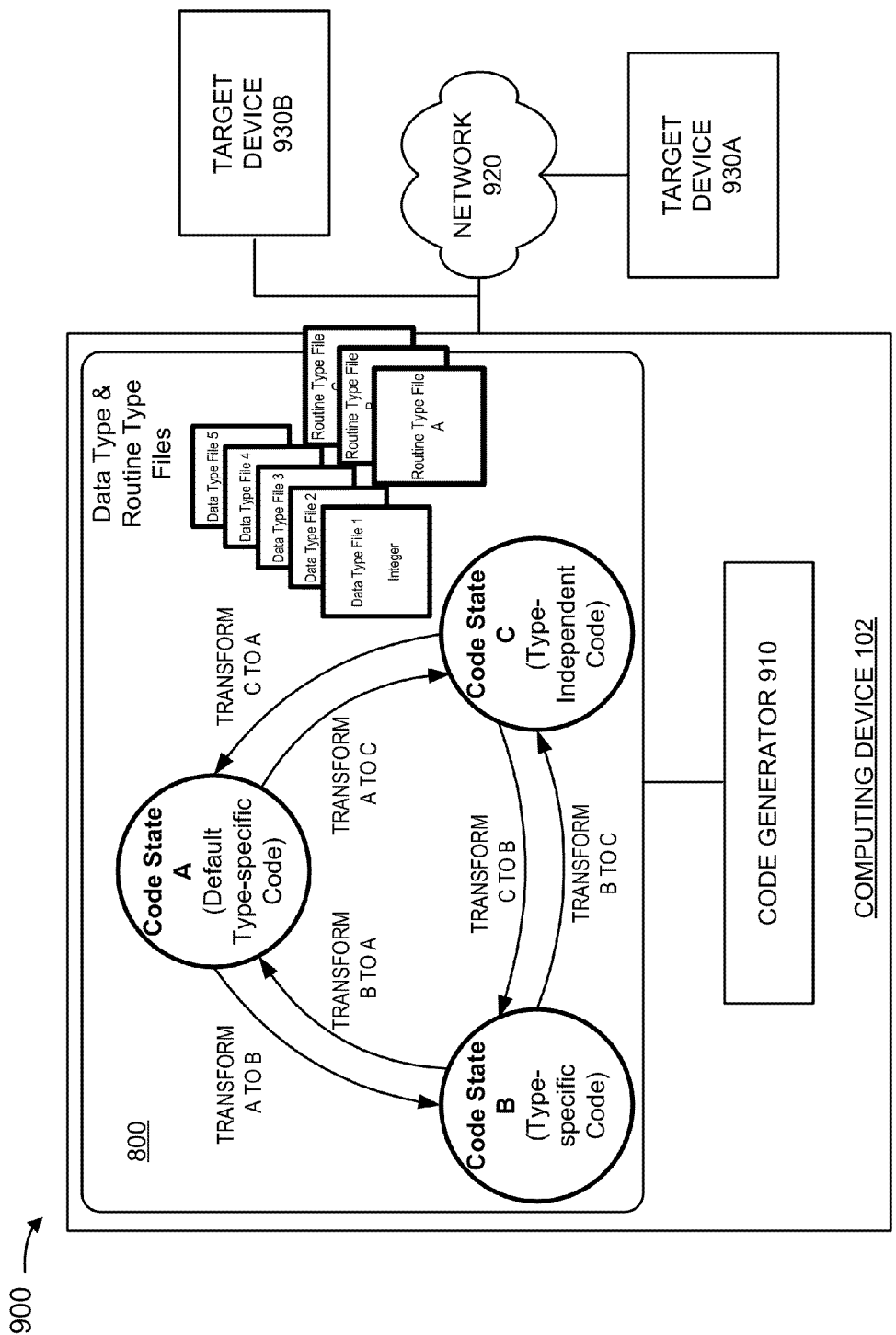
FIG. 9 is a diagram of an example system for generating type-specific code to be provided to a target device.

FIG. 9 is a diagram of an example system 900 for generating type-specific code to be provided to a target device. System 900 may include computing device 102, network 920, and target devices 930A and 930B. Computing device 102 is described hereinabove and may include system 800 (FIG. 8) and code generator 910. System 800 may perform conversions or transformations between code states, such as code states associated with type-independent and type-specific code. In an embodiment, system 800 may produce a result that may include type-independent or type-specific code that can be provided to code generator 910.

Code generator 910 may include software or a combination of software and hardware for transforming input code in a first format to generated code in a second format. For example, code generator 910 may receive code representing a model in a proprietary format, e.g., MATLAB format. Code generator 910 may transform the MATLAB code into another format, such as C++ code, hardware description language (HDL) code, etc. In an embodiment, code generator 910 can be configured to generate code intended for running on a destination device, such as target devices 930A and 930B.

Network 920 may be a communication network that includes digital and/or analog aspects. Information exchanged across network 920 may include machine-readable information having a format that may be used, for example, with one or more components in network 920 (e.g., switches, routers, gateways, etc.) and/or with devices coupled to network 920, such as computing device 102 and target device 930A.

For example, network information may be encapsulated in one or more packets that may be used to transfer the information through the network 920. Information may be exchanged between components in network 920 using various communication protocols, such as, but not limited to, the Internet Protocol (IP), Asynchronous Transfer Mode (ATM), Synchronous Optical Network (SONET), the User Datagram Protocol (UDP), Transmission Control Protocol (TCP), Institute of Electrical and Electronics Engineers (IEEE) 802.11, or other communication protocol.

Portions of network 920 may be wired (e.g., using wired conductors, optical fibers, wave guides, etc.) and/or wireless (e.g., using free-space optical (FSO), radio frequency (RF), acoustic transmission paths, etc.). Portions of network 920 may include a substantially open public network, such as the Internet. Portions of network 920 may include a more restricted network, such as a private corporate network or virtual private network (VPN). It should be noted that implementations of communication networks and/or devices operating on communication networks described herein are not limited with regards to, for example, information carried by the communication networks, protocols used in the communication networks, and/or the device architecture/configuration of the communication networks.

Target devices 930A and 930B may be computing devices configured to perform specific operations. For example, target device 930A may be a networked controller for a plant. The controller may receive generated code from computing device 102 (e.g., code generator 910) and may execute the code to perform plant control operations. Target devices 930 may also, or alternatively, be embedded devices configured to operate within a system. For example, target device 930 may be an embedded device intended for use in an automobile, such as an anti-lock braking system controller, an air bag deployment sensor, cruise control module, etc. Target devices can take many forms and may operate in a standalone fashion or in a networked fashion. Target devices can further be configured to operate with other target devices, such as networked processing labs collectively operating as a computing cloud on behalf of a client device.

Figure 10:
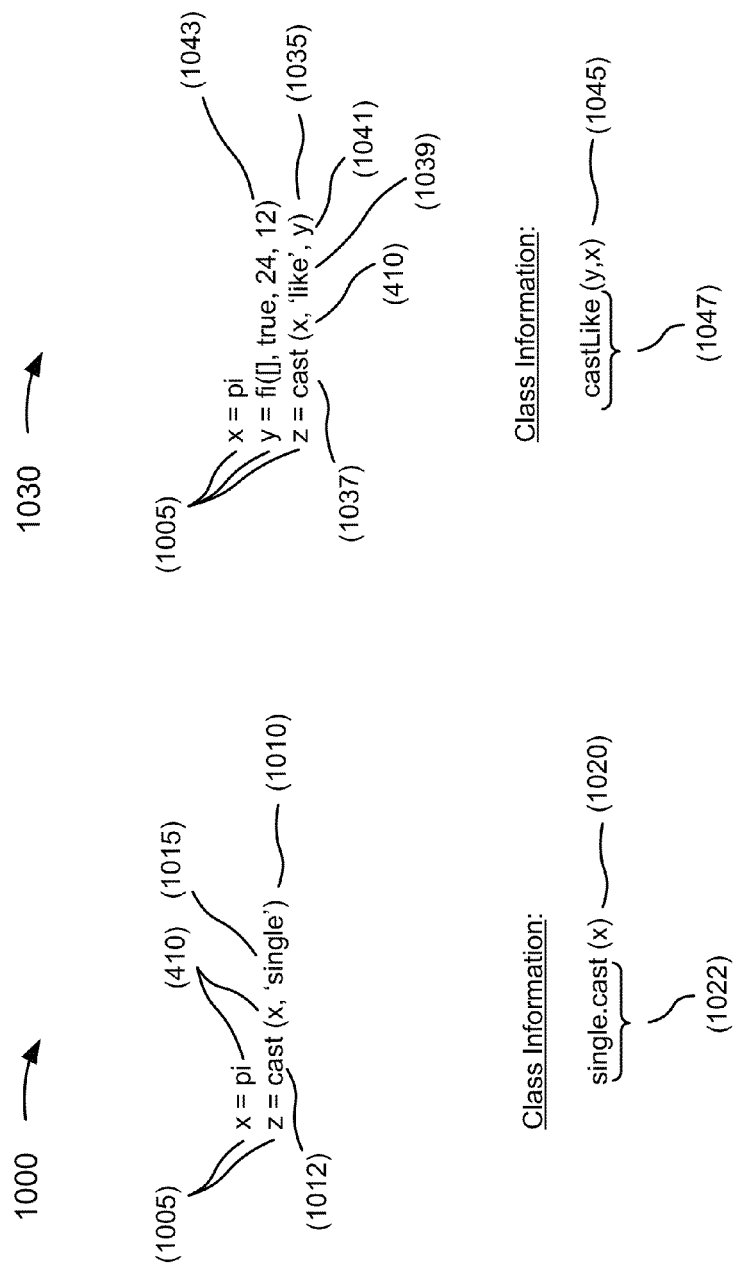
FIGS. 10A and 10B are diagrams of example codes that, when executed, enable a computing device to execute array creation routines that are separate from the codes.

FIGS. 10A and 10B are diagrams of example code 1000 and example code 1030, respectively, that, when executed, enable computing device 102 to execute array creation routines that are separate from code 1000 and/or code 1030 As illustrated in FIG. 10A, code 1000 may include lines of code 1005 (hereinafter referred to collectively as "lines of code 1005" and individually as a "line of code 1005"), an array creation routine 1010 (hereinafter referred to as "array routine 1010"), and a called routine 1020.

Line of code 1005 may include one or more variables 410 and/or array routines 1010. Line of code 1005 may also, or alternatively, include operators (e.g., +, −, *, etc.) that enable operations to be performed, based on variables 410 and/or array routines 1010, when line of code 1005 is executed. Line of code 1005 may also, or alternatively, include operators (e.g., =, ≅, ≠, ≥, etc.) that identify relationships between variables 405, array routines 1010, or some combination thereof.

Array routine 1010 may enable an act or operation to be performed when line of code 1005, with which array routine 1010 is associated, is executed by computing device 102 and/or user device 215. In one example, array routine 1010 may enable computing device 102 to create an array, such as, for example, an array of values associated with a variable (e.g., variable 410). Array routine 1010 may, for example, be type-independent, such that information associated with a data type and/or information associated with a routine type may not be identified within array routine 1010.

Array routine 1010 may include an array routine identifier 1012 and a set of arguments, such as an input variable 410 (e.g., x) and/or a class identifier 1015 (e.g., single). Array routine identifier 1012 may include a string of characters and/or values (e.g., such as an array routine name, etc.) that enables computing device 102 to identify array routine 1010 when executing code 1000. Class identifier 1015 may include a string of characters and/or values that correspond to a class that identifies one or more called routines 1020. Array routine 1010 may correspond to a pattern of syntax based on array routine identifier 1012, input variable 410, and/or class identifier 1015. In one example, the pattern may correspond to: variable 410=array routine identifier 1012 (input variable 410, 'class identifier 1015') (e.g., shown as z=cast(x, 'single') in FIG. 10A).

Called routine 1020 may correspond to a version of array routine 1010 based on how called routine 1020 is defined within the class identified by class identifier 1015. Called routine 1020 may, for example, correspond to a version of array routine 1010 associated with a particular data type (e.g., floating point, fixed point, integer, symbolic, GPU array, etc.) identified by the class. Called routine 1020 may also, or alternatively, correspond to a version of array routine 1010 associated with a particular routine type (e.g., associated with a type of user device 215). Called routine 1020 may also, or alternatively, correspond to a version of array routine 1010 associated with a combination of the particular data type and/or the particular routine type.

Called routine 1020 may, for example, include a called routine identifier 1022 and input variable 410 identified by array routine 1010. Called routine identifier 1022 may include a string of characters and/or values that enables computing device 102 to identify called routine 1020 when executing code 1000. Called routine 1020 may correspond to a pattern of syntax based on called routine identifier 1022 and input variable 410. In one example, the pattern may correspond to: call routine identifier 1022 (input variable 410) (e.g., shown as single.cast (x) in FIG. 10A), where called routine identifier 1022, in this example, may be represented by class identifier 1015 and array routine identifier 1012 (e.g., single.cast).

By way of example, computing device 102 may execute array routine 1010 and may, as a result of executing array routine 1010, identify class identifier 1015. Computing device 102 may identify a class (e.g., single) that corresponds to the identified class identifier 1015. Computing device 102 may also, or alternatively, access a file and/or data structure that stores information associated with the class (hereinafter referred to as "class information"). The class information may identify a particular call routine 1020 that corresponds to array routine identifier 1012 and class identifier 1015 (e.g., single.cast(x)). In this example, the class may correspond to a floating point (e.g., single precision) data type and may include one or more different array routines 1010 (e.g., zeros, ones, random, etc.) associated with the single precision floating point. Computing device 102 may use input variable 410 (e.g., x), associated with array routine 1010, to execute the identified called routine 1020 to generate a result that conforms to the floating point data type. Computing device 102 may associate the result with variable 410 (e.g., z) to which array routine 1010 corresponds.

In the example above, array routine 1010 may return a real value (e.g., z corresponds to a real value) when input variable 410 is real (e.g., when x corresponds to a real value) and may return a complex value (e.g., z corresponds to a complex value associated with real and imaginary components) when input value 410 is complex (e.g., when x corresponds to a complex value).

As illustrated in FIG. 10B, code 1030 may include lines of code 1005, an array creation routine 1035 (hereinafter referred to as "array routine 1035"), and a called routine 1045. Array routine 1035 may enable an act or operation to be performed when line of code 1005, with which array routine 1035 is associated, is executed by computing device 102 and/or user device 215. In one example, array routine 1035 may enable computing device 102 to create an array, such as, for example, an array of values associated with a variable (e.g., variable 410). Array routine 1035 may, for example, be type-independent, such that information associated with a data type and/or information associated with a routine type may not be identified within array routine 1035.

Array routine 1035 may include an array routine identifier 1037 (e.g., cast) and a set of arguments, such as an input variable 410 (e.g., x), a sentinel 1039 (e.g., like), and a prototype identifier 1041 (e.g., y). Array routine identifier 1037 may include a string of characters and/or values (e.g., such as an array routine name, etc.) that enables computing device 102 to identify array routine 1037 when executing code 1030. Sentinel 1039 may include a term or syntax that acts to logically separate one or more input variables 410 from prototype identifier 1041. Separating prototype identifier 1041 may enable computing device 102 to identify prototype identifier 1041; to distinguish prototype identifier 1041 from input variable 410; and/or to determine that prototype identifier 1041 does not represent class identifier 1015 (FIG. 10A). Sentinel 1039 may also, or alternatively, enable computing device 102 to distinguish between array routine 1035 (e.g., that includes sentinel 1039) and array routine 1010 (FIG. 10A) (e.g., that does not include sentinel 1037). While sentinel 1039 is described as including the term or syntax (e.g., "like"), in other implementations, sentinel 1039 may include another term or syntax (e.g., "type_of," "type of," "matching", "prototype", "sameas", etc.) that is different than the term or syntax.

Prototype identifier 1041 (e.g., y) may include a string of characters and/or values that correspond to a class instance 1043 (hereinafter referred to as "class instance 1043") identified in another line of code 405 (e.g., y=fi([ ], true, 24, 12)). In this example, class instance 1043 may identify a class (e.g., a class represented by fi). Additionally, or alternatively, class instance 1043 may include parameters (e.g., ([ ], true, 24, 12)) that enable an instance, within the identified class, to be determined, such as whether variable 410 is to be signed or unsigned, a quantity of bits to be associated with variable 410, a quantity of partial bits associated with variable 410, etc. The class may, in a manner similar to that described above with respect to FIG. 10A, identify one or more called routines 1045 associated with the class. Array routine 1035 may correspond to a pattern of syntax based on array routine identifier 1037, input variable 410, sentinel 1039, and/or prototype identifier 1041. In one example, the pattern may correspond to: variable 410=array routine identifier 1037 (input variable 410, 'sentinel 1039', prototype identifier 1041) (e.g., shown as z=cast(x, 'like', y) in FIG. 10B).

Called routine 1045 may correspond to a version of array routine 1035 based on how called routine 1045 is defined within the class associated with class instance 1043 (e.g., identified by prototype identifier 1041). Called routine 1045 may, for example, correspond to a version of array routine 1035 associated with a particular data type (e.g., a signed floating point, fixed point, integer, symbolic, GPU array, etc.); a particular routine type (e.g., associated with a type of user device 215); or some combination of the particular data type and/or the particular routine type identified by the class.

Called routine 1045 may, for example, include a called routine identifier 1047, prototype identifier 1041 (e.g., y) identified in array routine 1035, and input variable 410 (e.g., x) identified by array routine 1035. Called routine identifier 1047 may include a string of characters and/or values that enables computing device 102 to identify called routine 1045 when executing code 1030. Called routine 1045 may correspond to a pattern of syntax based on called routine identifier 1047, prototype identifier 1041, and/or input variable 410. In one example, the pattern may correspond to: call routine identifier 1047 (prototype identifier 1041, input variable 410) (e.g., shown as castLike(y,x)), where called routine identifier 1047, in this example, may be represented by array routine identifier 1037 and sentinel 1039 (e.g., castLike).

By way of example, computing device 102 may execute array routine 1035 and may, as a result of executing array routine 1035, identify sentinel 1039 (e.g., 'Like') that enables computing device 102 to distinguish array routine 1035 from array routine 1010 (FIG. 10A). Computing device 102 may, based on identifying sentinel 1039, identify prototype identifier 1041 (e.g., y). Computing device 102 may use prototype identifier 1041 to identify a line of code that includes class instance 1043. Computing device 102 may identify a class (e.g., a fixed point class represented by fi) based on class instance 1043 and may access class information, associated with the class, which is stored within a file and/or data structure. Computing device 102 may also, or alternatively, identify a particular call routine 1045 (e.g., castLike(y,x)), within the class information, that corresponds to array routine identifier 1037 and sentinel 1039 (e.g., castLike) associated with the executed array routine 1035. In this example, the class information may include one or more different array routines 1035 (e.g., zeros, ones, random, etc.) associated with the fixed point data type. Computing device 102 may use input variable 410 (e.g., x) and class instance 1043 (e.g., y=fi([ ], true, 24, 12) to execute the identified called routine 1045 to generate a result (e.g., that conforms to the fixed point data type). Computing device 102 may associate the result with variable 410 (e.g., z) to which array routine 1035 corresponds.

Additionally, or alternatively, computing device 102 may identify a called array creation routine, associated with TCE 210, that corresponds to a particular class (e.g., a built in class, such as builtin_zeros( ), builtin_ones( ), etc.). In this example, computing device 102 may execute the called routine, identified by the particular class, that corresponds to the array-creation routine associated with TCE 210, using parameters identified by the particular class.

In the example above, array routine 1035 may return a real value (e.g., z corresponds to a real value) when prototype identifier 1041 is real (e.g., when y corresponds to a real value) and may return a complex value (e.g., z corresponds to a complex value) when prototype identifier 1041 is complex (e.g., when y corresponds to a complex value). Additionally, or alternatively, array routine 1035 may return a real value (e.g., z corresponds to a real value) when input variable 410 and prototype identifier 1041 are real (e.g., when x and y correspond to real values) and may return a complex value (e.g., z corresponds to a complex value) when input variable 410 or prototype identifier 1041 is complex (e.g., when x or y correspond to a complex value).

Figure 11:
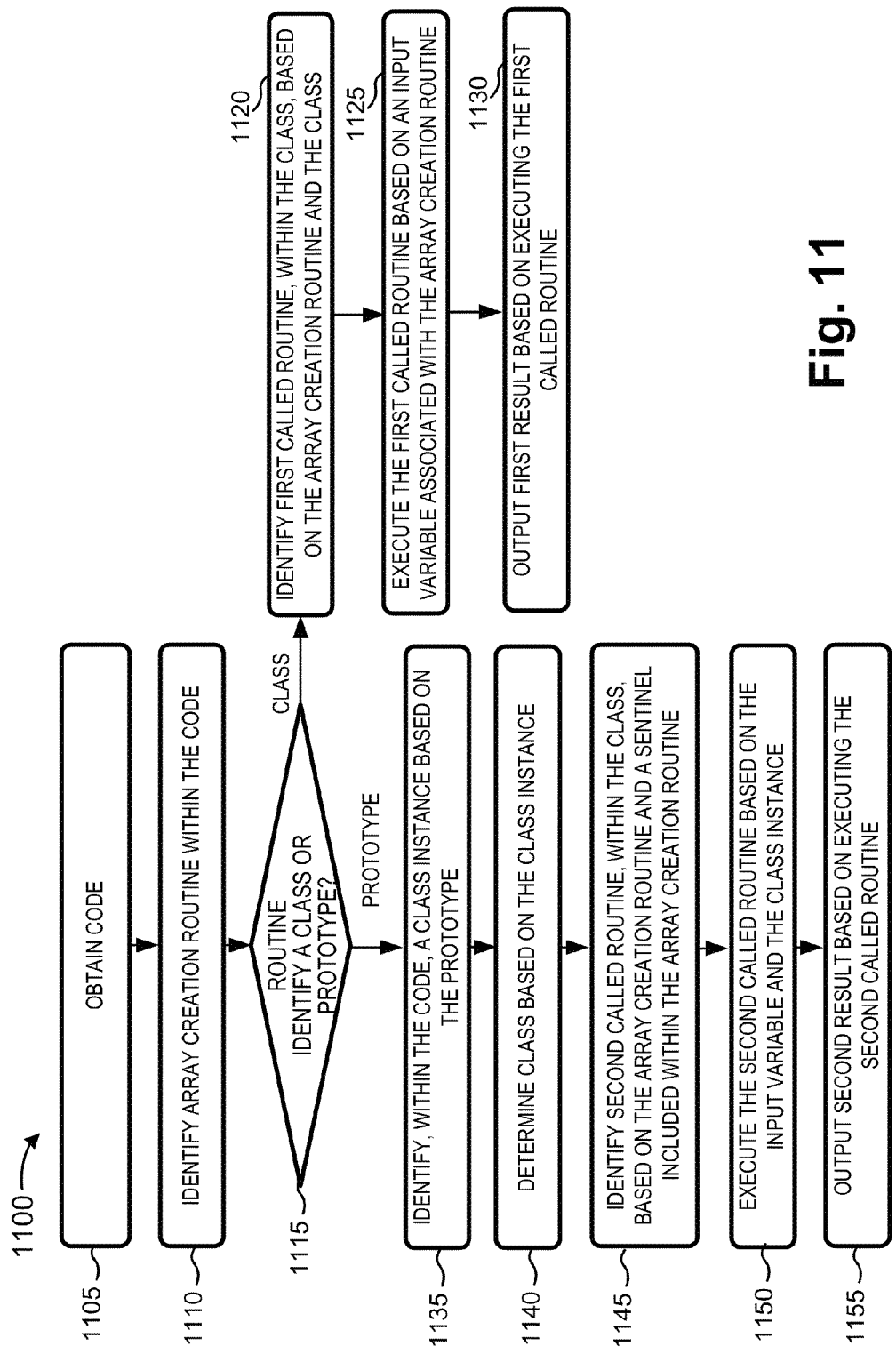
FIG. 11 is a flow chart of an example process for executing an array creation routine, that is separate from code being executed by a computing device, based on an instruction included within the code.

FIG. 11 is a flow chart of an example process 1100 for executing an array creation routine, that is separate from code being executed by computing device 102, based on an instruction included within the code. In one implementation, process 1100 may be performed by computing device 102. Additionally, or alternatively, process 1100 may be performed by a device, or group of devices, separate from, or in combination with, computing device 102.

As shown in FIG. 11, process 1100 may include obtaining code (block 1105) and identifying an array creation routine within the code (block 1110). For example, a user may provide a request, to computing device 102, to execute code. Computing device 102 may receive the request and may obtain the code from a memory associated with computing device 102. Computing device 102 may execute the code and may identify an array creation routine (e.g., array creation routine 1010 of FIG. 10A or array creation routine 1035 of FIG. 10B) within a line of the code.

As also shown in FIG. 11, if the array creation routine identifies a class (block 1115—CLASS), process 1100 may include identifying a first called routine based on the array creation routine and the class (block 1120). For example, computing device 102 may determine whether the array creation routine identifies a class or a prototype based on arguments included within the array creation routine. In one example, computing device 102 may determine that the array creation routine does not include sentinel 1039 (e.g., such as 'like', 'type_of', 'type of', 'matching', 'prototype', 'sameas', etc.). Based on the determination that the array creation routine does not include sentinel 1039, computing device 102 may determine that the array creation routine corresponds to a first array creation routine 1010 (e.g., z=cast (x, 'single') of FIG. 10A). Computing device 102 may, for example, determine that the arguments, included within array creation routine 1010, correspond to input variable 410 (e.g., x) and class identifier 1015 (e.g., single). Computing device 102 may distinguish class identifier 1015 from another input variable 410 based on one or more symbols, such as single quotation marks (e.g., 'single') or some other symbols, that are used to identify class identifier 1015.

Computing device 102 may obtain class information associated with class identifier 1015. In one example, computing device 102 may retrieve a file that includes the class information. Additionally, or alternatively, computing device 102 may access a data structure, file, table, etc., within a memory associated with computing device 102, to retrieve the class information. The class information may include, for example, a list of called routines 1020 that represent different versions of the first array creation routine 1010. Computing device 102 may also, or alternatively, identify a first called routine 1020, within the list of called routines 1020, that corresponds to array routine identifier 1012 (e.g., cast) associated with the first array creation routine 1010 and class identifier 1015 (e.g., single.cast(x)).

Additionally, or alternatively, computing device 120 may determine that a second array creation routine 1010 (e.g., z=zeros(m, n, p)) does not include sentinel 1039 (e.g., 'like', type_of, 'type of', 'matching', 'prototype', 'sameas', etc.). In this example, computing device 102 may determine that arguments associate with the other array creation routine 1010 corresponds to input variables 410 (m, n, p) and/or that the second array creation routine 1010 corresponds to a default class (e.g., associated with a default data type, such as double precision floating point, and/or some other default data type). Assume, in this example, that one or more other lines of code associate a data type with input variables 410 (m=int8(2); n=int8(3); and p=int8(4)). In a manner similar to that described above, computing device 120 may identify a second called routine 1020 (e.g., double.zeros(m,n,p); zeros(m, n,p); etc.) within class information associated with the default class.

As further shown in FIG. 11, process 1100 may include executing the first called routine based on an input variable associated with the array creation routine (block 1125) and outputting a first result based on executing the first called routine (block 1130). For example, computing device 102 may identify a value, associated with input variable 410 included within the first array creation routine 1010, and may execute the first called routine 1020 to generate a first result that corresponds to a data type and/or routine type associated with the class. Computing device 102 may also, or alternatively, associate the first result with variable 410 (e.g., z) to which array creation function 1010 corresponds and/or may output the first result.

Additionally, or alternatively, computing device 102 may execute the second called routine 1020 which may cause computing device 102 to generate a set of arrays (e.g., associated with one or more values that are equal to zero) associated with the default data type. The set of arrays may, for example, include a quantity of arrays (e.g., 4 arrays based on input variable 410 p=int8(4)) of particular dimensions (e.g., 2 by 3) associated with other input variables 410 (e.g., m by n).

As also shown in FIG. 11, if the array creation routine identifies a prototype (block 1115—PROTOTYPE), process 1100 may include identifying, within the code, a class instance based on the prototype (block 1135), and determining a class based on the class instance (block 1140). For example, computing device 102 may determine that the array creation routine includes sentinel 1039 (e.g., such as 'like') and, based on this, may determine that the array creation routine corresponds to a first array creation routine 1035 (e.g., z=cast(x, 'like', y) of FIG. 10B). Computing device 102 may, for example, determine that the arguments, included within the first array creation routine 1035, correspond to input variable 410 (e.g., x), sentinel 1039, and prototype identifier 1041 (e.g., y). Computing device 102 may use prototype identifier 1041 to identify, within the code, a class instance 1043 (e.g., y=fi([ ], true, 24, 12) of FIG. 10B) that corresponds to prototype identifier 1041. Computing device 102 may also, or alternatively, identify a class based on class instance 1043.

Additionally, or alternatively, computing device 102 may determine that a second array creation routine 1035 (e.g., z=zeros(m,n,'like', p) includes another sentinel 1039 (e.g., 'like') and, based on this, may determine that the arguments, included within the second array creation routine 1035, correspond to input variables 410 (e.g., m and n), other sentinel 1039, and another prototype identifier 1041 (e.g., p). Assume, in this example, that one or more other lines of code associate a data type with input variables 410 (e.g., m=int8(2) and n=int8(3)). Computing device 102 may use the other prototype identifier 1041 to identify, within the code, another class instance 1043 (e.g., p=int8(4)) that corresponds to another class (e.g., int8) based on the other class instance 1043.

As further shown in FIG. 11, process 900 may include identifying a second called routine, within the class, based on the array creation routine and a sentinel included within the array creation routine (block 1145). For example, computing device 102 may, in a manner similar to that described above with respect to block 1120, obtain class information associated with the identified class. The class information may include, for example, a list of called routines 1045 that represent different versions of the first array creation routine 1035. Computing device 102 may also, or alternatively, identify a first called routine 1045, within the list of called routines 1045, that corresponds to array routine identifier 1037 (e.g., cast) associated with the first array creation routine 1035 and sentinel 1039 (e.g., castLike(y,x)).

Additionally, or alternatively, computing device 102 may, in a manner similar to that described above, obtain other class information associated with the other identified class (e.g., int8). Computing device 102 may also, or alternatively, identify a second called routine 1045 (e.g., zerosLike(p,m,n)), within the other class information, associated with the second array creation routine 1035 and the other sentinel 1039.

Additionally, or alternatively, when computing device 102 cannot identify the second called routine 1045, within the other class information, computing device 102 may determine whether the first called routine 1020 can be identified within the class information in a manner similar to that described above with respect to block 1120. Computing device 102 may execute the first called routine in a manner similar to that described above with respect to block 1125 when the first called routine is identified within the class information. Additionally, or alternatively, when computing device 102 cannot identify the first called routine 1020 (e.g., within the class information) and the second called routine 1045 (e.g., within the other class information), computing device 102 may output a notification indicating that an error has occurred.

As yet further shown in FIG. 11, process 1100 may include executing the second called routine based on an input variable and the class instance (block 1150) and outputting a second result based on executing the second called routine (block 1155). For example, computing device 102 may identify a value, associated with input variable 410 included within the first array creation routine 1035, and may use the input value to execute the first called routine 1045 to generate a second result. Computing device 102 may, for example, generate the second result in a manner that conforms to class instance 1043 (e.g., that corresponds to a data type and/or routine type). Computing device 120 may associate the second result with variable 410 (e.g., z) to which the first array creation function 1035 corresponds and/or may output the second result.

Additionally, or alternatively, computing device 102 may execute the second called routine 1045, which may cause computing device 102 to generate an array (e.g., associated with values that are equal to zero) associated with a data type (e.g., integer data type) identified by the other class. The array may, for example, correspond to particular dimensions associated with input variables 410 (e.g., m by n) associated with second array creation function 1035.

Systems and/or methods, described herein, may enable a computing device to generate type-independent code based on type-specific code. The systems and/or methods may enable the computer device to remove data type information and/or routine type information from the type-specific code to create modified code. The systems and/or methods may enable the computing device to insert instructions into the modified code to create the type-independent code. The instructions may enable the computing device to obtain data type information associated with one or more data types and/or routine type information, associated with one or more routine types, to be used to execute the type-independent code.

The systems and/or methods may also, or alternatively, enable the computing device to generate type-specific code based on type-independent code. The systems and/or methods may enable the computing device to remove instructions from the type-independent code and to insert data type information associated with a particular data type and/or routine type information, associated with a particular routine type, into the type-independent code to create the type-specific code associated with the particular data type and/or the particular routine type.

The systems and/or methods may enable a computing device to execute an array creation routine, included within code, which causes the computing device to obtain a different array creation routine stored within a data structure. Thus, the array creation routine may be replaced, by the different array creation routine, without changing the code.

The foregoing description provides illustration and description, but is not intended to be exhaustive or to limit the description to the precise form disclosed. Modifications and variations are possible in light of the above implementations or may be acquired from practice of the implementations.

While series of blocks have been described with regard to FIGS. 5, 7, and 11 the order of the blocks may be modified in other implementations. Further, non-dependent blocks may be performed in parallel.

It will be apparent that example aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Further, certain implementations may involve a component that performs one or more functions. These components may include hardware, such as an ASIC or a FPGA, or a combination of hardware and software.

Even though particular combinations of features are recited in the claims and/or disclosed in the specification, these combinations are not intended to limit disclosure of the possible implementations. In fact, many of these features may be combined in ways not specifically recited in the claims and/or disclosed in the specification. Although each dependent claim listed below may directly depend on only one other claim, the disclosure of the implementations includes each dependent claim in combination with every other claim in the claim set.

No element, act, or instruction used in the present application should be construed as critical or essential to the implementations unless explicitly described as such. Also, as used herein, the article "a" is intended to include one or more items and may be used interchangeably with "one or more." Where only one item is intended, the term "one" or similar language is used. Further, the phrase "based on" is intended to mean "based, at least in part, on" unless explicitly stated otherwise.

What is claimed is:

1. A method comprising:
   obtaining code that includes a plurality of variables and a plurality of routines,
      the obtaining the code being performed by a computing device;
   identifying, within a first sequence of the code and based on obtaining the code, a routine of the plurality of routines,
      the first sequence of code comprising type-independent code,
      the routine including a variable, of the plurality of variables,
      the routine enabling, when executed, the computing device to create an array of values associated with the variable, and
      the identifying being performed by the computing device;
   determining whether the routine includes sentinel,
      the sentinel acting to logically separate the variable from a prototype identifier included in the routine, and
      the determining whether the routine includes the sentinel being performed by a computing device;
   determining that another variable, included in the routine, comprises the prototype identifier based on the sentinel,
      the prototype identifier indicating a second sequence of the code that identifies a class associated with the routine,
         the class being associated with one or more first called routines associated with the routine,
            each first called routine of the one or more first called routines:
               corresponding to a respective version of the routine, and
               being associated with at least one of:
                  a respective data type of a plurality of data types, or
                  a respective routine type of a plurality of routine types, and
      the determining that the other variable comprises the prototype identifier being performed by the computing device;
   identifying a first called routine, of the one or more first called routines, based on the sentinel and a routine identifier associated with the routine,
      the identifying the first called routine being performed by the computing device;
   executing, using the variable, the first called routine to generate a result that includes the array of values,
      the executing the first called routine being performed by the computing device; and
   outputting the result based on executing the first called routine,
      the outputting the result being performed by the computing device.

2. The method of claim 1, further comprising:
   obtaining, from the second sequence of the code, first information associated with a data type, of the plurality of data types, or second information associated with a routine type of the plurality of routine types; and
   where executing the first called routine includes:
      executing the first called routine based on the first information or the second information to generate the result.

3. The method of claim 1 further comprising:
   determining that the routine includes a class identifier when the routine does not include the sentinel,
      the class identifier identifying a particular class,
         the particular class being associated with one or more second called routines associated with the routine;
   identifying a second called routine, of the one or more second called routines, based on the class identifier and the routine identifier;
   executing, using the variable, the second called routine to generate another result; and
   outputting the other result based on executing the second called routine.

4. The method of claim 1, where the sentinel:
   enables the computing device to associate the variable with first information associated with a data type, of the plurality of data types, or second information associated with a routine type, of the plurality of routine types,
      the first information or the second information being included within the second sequence of the code.

5. The method of claim 1, where the routine corresponds to an array creation command that includes a general form of:
   the routine identifier(the variable, 'the sentinel, ' the prototype identifier).

6. The method of claim 1, where the sentinel corresponds to at least one of:
   like,
   type_of,
   type of
   matching,
   prototype, or
   sameas.

7. The method of claim 1, where identifying the first called routine further includes:
   identifying a called routine identifier associated with the first called routine based on the sentinel and the routine identifier; and
   obtaining the first called routine based on the first called routine corresponding to the called routine identifier.

8. The method of claim 7, where the called routine identifier includes a general form of at least one of:
   the routine identifier the sentinel(the prototype identifier, the variable),
   the routine identifier the sentinel (the variable, the prototype identifier), the sentinel the routine identifier(the prototype identifier, the variable), or the sentinel the routine identifier(the variable, the prototype identifier).

9. A computing device comprising:
one or more processors to:
obtain code that includes a plurality of sequences of code,
identify, within a first sequence of code, of the plurality of sequences of code, and based on obtaining the code, a first routine,
the first sequence of code comprising type-independent code,
the first routine including one or more variables, and
the first routine enabling, when executed, an array of values to be generated,
the array of values being associated with the one or more variables,
determine whether the first routine includes a sentinel,
the sentinel enabling a prototype identifier, included within the first sequence of code, to be distinguished from the one or more variables,
the prototype identifier corresponding to a second sequence of code, of the plurality of sequences of code,
determine, when the first routine includes the sentinel, a class based on the second sequence of code,
the class identifying one or more second routines,
each second routine of the one or more second routines:
corresponding to a respective version of the first routine, and
being associated with at least one of:
a respective data type of a plurality of data types, or
a respective routine type of a plurality of routine types,
identify, based on the sentinel, a second routine, of the one or more second routines, associated with the first routine,
execute, using the one or more variables, the second routine to generate a result that includes the array of values, and
output the result based on executing the second routine.

10. The computing device of claim 9, where the one or more processors are further to:
obtain, from the second sequence of code, first information associated with a data type, of the plurality of data types, or second information associated with a routine type of the plurality of routine types, and
where, when executing the second routine, the one or more processors are to:
execute the second routine based on the first information or the second information to generate the result.

11. The computing device of claim 9, where the one or more processors are further to:
determine that the first routine includes a class identifier when the first routine does not include the sentinel,
the class identifier identifying a particular class,
the particular class being associated with one or more third routines,
identify a third routine, of the one or more third routines, associated with the first routine, and
execute, using the one or more variables, the third routine to generate the result.

12. The computing device of claim 9, where the sentinel enables the one or more processors to execute the second routine in a manner that conforms to a data type, of the plurality of data types, or a routine type, of the plurality of routine types, identified by the second sequence of code.

13. The computing device of claim 9, where the first routine corresponds to an array creation command that includes a general form of:
a routine identifier(the one or more variables, 'the sentinel, ' the prototype identifier), and
where the routine identifier corresponds to the first routine.

14. The computing device of claim 13, where the sentinel corresponds to at least one of:
like,
type_of,
type of
matching,
prototype, or
sameas.

15. The computing device of claim 9, where the first routine corresponds to an array creation command that includes a general form of:
a routine identifier(the one or more variables, 'the sentinel, ' first information),
where the routine identifier corresponds to the first routine, and
where the first information identifies the class.

16. The computing device of claim 9, where the one or more processors are further to:
identify a third sequence of code, of the plurality of sequences of code, that includes a third routine,
identify a another sentinel within the third routine,
the other sentinel enabling the one or more processors to distinguish between a particular variable within the third routine and a first identifier within the third routine,
the first identifier corresponding to an entry in a data structure that corresponds to a data type, of the plurality of data types, or a routine type of the plurality of routine types,
access, using the first identifier, the data structure to obtain information associated with the data type or the routine type; and
execute the third routine based on the information associated with the data type or the routine type.

17. The computing device of claim 16, where the third routine corresponds to an instruction to obtain information associated with the data type or the routine type,
where the third routine including a general form of:
a second identifier(the particular variable, 'the other sentinel, ' the first identifier), and
where the second identifier corresponds to the instruction.

18. One or more non-transitory computer-readable media storing instructions, the instructions comprising:
one or more instructions that, when executed by a processor of a computing device, cause the processor to:
obtain code that includes a plurality of sequences of code;
identify, within a first sequence of code, of the plurality of sequences of code, and based on obtaining the code, a first routine,
the first sequence of code comprising type-independent code,
the first routine including a variable, and
the first routine enabling, when executed, an array of values to be generated,
the array of values being associated with the variable;

determine whether the first routine includes a sentinel;
identify, within the first routine, a prototype identifier when the first routine includes the sentinel,
the prototype identifier corresponding to a second sequence of code, of the plurality of sequences of code, that identifies a data structure that stores information that identifies one or more second routines,
each second routine of the one or more second routines:
corresponding to a respective version of the first routine, and
being associated with one or more of:
a respective data type of a plurality of data types, or
a respective routine type of a plurality of routine types;
identify, within the data structure, a second routine, of the one or more second routines, based on the sentinel and a routine identifier corresponding to the first routine;
execute, using the variable, the second routine to generate a result that includes the array of values; and
output the result based on executing the second routine.

19. The one or more non-transitory computer-readable media of claim 18, where the instructions further comprise:
one or more instructions that, when executed by the processor, cause the processor to:
identify, within the second sequence of code, a data type, of the plurality of data types, or a routine type of the plurality of routine types; and
where the one or more instructions to execute the second routine include:
one or more instructions that, when executed by the processor, cause the processor to:
execute the second routine in a manner that conforms to the data type or the routine type.

20. The one or more non-transitory computer-readable media of claim 18, where the instructions further comprise:
determine that the first routine includes a class identifier when the first routine does not include the sentinel,
the class identifier identifying a second data structure that stores one or more third routines,
identify, within the second data structure, a third routine, of the one or more third routines, associated with the first routine,
execute, using the variable, the third routine to generate another result, and
output the other result based on executing the third routine.

21. The one or more non-transitory computer-readable media of claim 18, where the first routine corresponds to an array creation command that includes a general form of:
the routine identifier (the variable, 'the sentinel ' the prototype identifier).

22. The one or more non-transitory computer-readable media of claim 18, where the instructions further comprise:
one or more instructions that, when executed by the processor, cause the processor to:
determine whether the variable corresponds to a first real value or a first complex value;
determine whether the prototype identifier corresponds to a second real value or a second complex value; and
generate the result in a manner that corresponds to a real value when the variable corresponds to the first real value and the prototype identifier correspond to the second real value.

23. The one or more non-transitory computer-readable media of claim 22, where the instructions further comprise:
one or more instructions that, when executed by the processor, cause the processor to:
generate the result in a manner that corresponds to a complex value when the variable corresponds to the first complex value or the prototype identifier correspond to the second complex value.

24. The one or more non-transitory computer-readable media of claim 18, where the instructions further comprise:
one or more instructions that, when executed by the processor, cause the processor to:
identify, within a third sequence of code, of the plurality of sequences of code, a third routine,
the third routine including an instruction that, when executed, causes particular information to be obtained,
the particular information being associated with a data type, of the plurality of data types, or a routine type of the plurality of routine types, and
execute the third routine to generate another result,
the other result conforming to the data type or the routine type.

25. The one or more non-transitory computer-readable media of claim 24, where the instruction includes at least one of:
a particular variable,
a third identifier that corresponds to an entry, of a plurality of entries, within another data structure,
the other data structure storing:
the particular information associated with the data type or the routine type, or
the sentinel that associates the particular variable with the third identifier.

26. The one or more non-transitory computer-readable media of claim 25, where the instruction corresponds to the general form of:
a fourth identifier (the particular variable, 'the sentinel', the third identifier).

27. The one or more non-transitory computer-readable media of claim 18, where the instructions further comprise:
one or more instructions that, when executed by the processor, cause the processor to:
determine that a third routine, identified within a third sequence of code,. of the plurality of sequences of code, includes the sentinel;
identify, within the third routine, a third identifier based on the third routine including the sentinel,
the third identifier corresponding to a fourth sequence of code, of the plurality of sequences of code, that identifies a first data structure that stores information that identifies one or more fourth routines;
determine whether the first data structure stores a particular fourth routine, of the one or more fourth routines, based on the sentinel and a fourth identifier corresponding to the third routine;
access a second data structure that stores one or more fifth routines when the first data structure does not store the particular fourth routine;
identify, within the second data structure, a particular fifth routine, of the one or more fifth routines, associated with the third routine;
execute, using the variable, the fifth routine to generate another result; and
output the other result based on executing the fifth routine.

* * * * *